United States Patent [19]
Stich et al.

[11] Patent Number: 5,602,462
[45] Date of Patent: Feb. 11, 1997

[54] UNINTERRUPTIBLE POWER SYSTEM

[75] Inventors: Frederick A. Stich, Wisconsin Rapids; Thomas G. Hubert, Necedah; David L. Layden, New Lisbon; Donald K. Zahrte, Necedah, all of Wis.

[73] Assignee: Best Power Technology, Incorporated, Necedah, Wis.

[21] Appl. No.: 391,761

[22] Filed: Feb. 21, 1995

[51] Int. Cl.$^6$ ................................. G05F 1/16; H02J 7/00; H02J 9/00

[52] U.S. Cl. ............................. 323/258; 307/64; 307/66; 363/101; 320/48; 323/259

[58] Field of Search .................................. 307/64–66, 86, 307/87, 85; 363/34, 101; 323/258, 259, 340, 344, 263; 320/48, 32, 2, 46; 364/483

[56] References Cited

U.S. PATENT DOCUMENTS

| | | | |
|---|---|---|---|
| 2,417,754 | 3/1947 | Hibbard | 171/242 |
| 3,445,753 | 5/1969 | Maxwell | 323/43.5 |
| 3,614,595 | 10/1971 | Paulden | 323/6 |
| 3,688,177 | 8/1972 | Reeves et al. | 320/24 |

(List continued on next page.)

FOREIGN PATENT DOCUMENTS

| | | |
|---|---|---|
| 2602789 | 7/1977 | Germany . |
| 9107803 | 5/1991 | WIPO . |
| 9115048 | 10/1991 | WIPO . |

OTHER PUBLICATIONS

Reid, et al., "A New Concept: Intermittent Charging of Lead Acid Batteries in Telecommunication Systems", IEEE, pp. 67–71, May, 1984.

Deltec Corp., Advertisement, "A More Profitable Approach to LAN Protection", Varbusiness, Jun., 1994.

Heart Interface Corp., Press Release, "Regulator Allows Charging From Alternator", The Battery Man, pp. 31–32, Apr., 1995.

David O. Feder & Gino Carosella, "The Never–Ending Pursuit of Float Voltage Uniformity in Stationary Reserve Battery Plants", Power Quality Assurance, pp. 42–55, Jan./Feb. 1995.

Primary Examiner—Peter S. Wong
Assistant Examiner—Adolf Berhane
Attorney, Agent, or Firm—Foley & Lardner

[57] ABSTRACT

An uninterruptible power system has a transformer with a primary connected to input terminals, a secondary connected to output terminals, a static switch connected between the input terminals and the primary, and an auxiliary primary connected to an inverter which is supplied by a battery to provide output voltage to the output terminals when a main AC power system connected to the input terminals has failed. The primary has multiple taps at different voltage levels and a buck-boost winding. The taps of the transformer are switched and the buck-boost winding is controlled to provide either buck, boost, or pass-by to allow control of the output voltage from the transformer to within a few percent of a desired voltage level despite large changes in the input voltage. A battery charger coupled to the auxiliary primary operates as a boost converter to provide current to charge the battery at a current level which tracks the input voltage from the AC power system, thereby providing a substantially unity power factor to the AC power system. The voltage control of the output voltage also controls the voltage at the output of the auxiliary primary to which the battery charger is connected, whereby the voltage applied to the charger is substantially regulated and the output power of the charger itself is substantially regulated. The charger can be operated in programmable modes to provide a desired charge configuration for the battery. Detection of faults in the AC power system is enhanced by accurate detection of the zero crossings of the input voltage from the AC power system, and by comparison of the AC input power waveform with an adaptive reference.

51 Claims, 14 Drawing Sheets

Microfiche Appendix Included
(2 Microfiche, 93 Pages)

U.S. PATENT DOCUMENTS

| | | | |
|---|---|---|---|
| 3,854,082 | 12/1974 | Nasby et al. | 320/22 |
| 3,887,858 | 6/1975 | Burkett et al. | 320/31 |
| 4,031,463 | 6/1977 | Norberg | 324/77 |
| 4,096,394 | 6/1978 | Ullman et al. | 307/46 |
| 4,207,513 | 6/1980 | Hess, Jr. | 320/23 |
| 4,277,692 | 7/1981 | Small | 307/66 |
| 4,366,389 | 12/1982 | Hussey | 307/66 |
| 4,388,534 | 6/1983 | Love et al. | 307/66 |
| 4,400,624 | 8/1983 | Ebert, Jr. | 307/43 |
| 4,400,625 | 8/1983 | Hussey | 307/66 |
| 4,467,265 | 8/1984 | Hieholzer, Jr. | 320/17 |
| 4,472,672 | 9/1984 | Pacholok | 320/21 |
| 4,473,756 | 9/1984 | Brigden et al. | 307/66 |
| 4,488,057 | 12/1984 | Clarke | 307/66 |
| 4,516,035 | 5/1985 | Rhoads et al. | 307/66 |
| 4,549,127 | 10/1985 | Taylor et al. | 320/21 |
| 4,549,254 | 10/1995 | Kissel | 363/21 |
| 4,584,514 | 4/1986 | Kaminski | 320/33 |
| 4,591,779 | 5/1986 | Carpenter, Jr. et al. | 323/301 |
| 4,604,530 | 8/1986 | Shibuya | 307/66 |
| 4,641,042 | 2/1987 | Miyazawa | 307/66 |
| 4,673,825 | 6/1987 | Raddi et al. | 307/66 |
| 4,692,686 | 9/1987 | Thomas | 323/263 |
| 4,692,854 | 9/1987 | Baxter, Jr. et al. | 363/75 |
| 4,694,402 | 9/1987 | McEachern et al. | 364/487 |
| 4,695,784 | 9/1977 | Reynolds | 320/32 |
| 4,713,553 | 12/1987 | Townsend et al. | 307/64 |
| 4,716,357 | 12/1987 | Cooper | 323/263 |
| 4,748,341 | 5/1988 | Gupta | 307/64 |
| 4,763,013 | 8/1988 | Gvoth, Jr. et al. | 307/66 |
| 4,763,014 | 8/1988 | Model et al. | 307/66 |
| 4,782,241 | 11/1988 | Baker et al. | 307/66 |
| 4,797,936 | 1/1989 | Nakatsugawa et al. | 382/1 |
| 4,814,934 | 3/1989 | Jones et al. | 361/88 |
| 4,843,299 | 6/1989 | Hutchings | 320/31 |
| 4,860,185 | 8/1989 | Brewer et al. | 363/41 |
| 4,890,005 | 12/1989 | Schornack | 307/87 |
| 4,916,329 | 4/1990 | Dang et al. | 307/66 |
| 4,920,475 | 4/1990 | Rippel | 363/132 |
| 4,956,563 | 9/1990 | Schornack | 307/66 |
| 5,019,717 | 5/1991 | McCurrey et al. | 307/66 |
| 5,055,703 | 10/1991 | Schornack | 307/64 |
| 5,166,595 | 11/1992 | Leverich | 320/32 |
| 5,182,518 | 1/1993 | Stich et al. | 324/511 |
| 5,184,025 | 2/1993 | McCurrey et al. | 307/66 |
| 5,229,650 | 7/1993 | Kita et al. | 307/66 |
| 5,229,651 | 7/1993 | Baxter, Jr. et al. | 307/66 |
| 5,295,078 | 3/1994 | Stich et al. | 364/483 |
| 5,315,533 | 5/1994 | Stich et al. | 364/480 |
| 5,440,179 | 8/1995 | Severinsky | 307/66 |
| 5,465,011 | 11/1995 | Miller et al. | 307/64 |
| 5,532,523 | 7/1996 | Tang | 307/64 |

UNINTERRUPTIBLE POWER SYSTEM

This application includes a microfiche appendix listing of a computer program having 2 microfiche and 93 frames. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains generally to the field of power systems and particularly to uninterruptible power supplies or systems.

BACKGROUND OF THE INVENTION

Uninterruptible power supplies or systems (commonly referred to as UPS) are used to provide back-up power to critical loads, such as computer systems, where a loss of line power can result in the interruption of programs and the loss of valuable data. Uninterruptible power supplies may also provide a line power conditioning function to ensure that transient spikes, low-voltage conditions, or distorted power waveforms on the AC power system do not disturb the operation of the computer which is supplied with power through the UPS. Typically, the UPS includes a battery which is interfaced through an inverter to the AC output line of the system at the same frequency and with substantially the same waveform as the normal AC power input to the system. It is desirable that the switching between line and battery power at the time of a fault is accomplished as smoothly as possible so that substantial transient spikes or dips in the waveform supplied to the AC output line do not occur.

In certain UPS systems power is normally delivered from the AC power mains through a transformer to the load. Upon detection of a power outage or brown-out (low voltage) on the AC power lines, a switch is opened to disconnect the primary of the transformer from the AC power mains. Simultaneously, an inverter is turned on to supply power from a battery to an auxiliary primary of the transformer which then takes over the job of supplying the power to the load. Such a UPS is shown in U.S. Pat. No. 5,315,533 to Stich, et al., entitled Back-Up Uninterruptible Power System. UPS using a ferroresonant transformer are shown in U.S. Pat. No. 4,692,854 to Richard V. Baxter, et al. entitled Method and Apparatus for Modulating Inverter Pulse Width and U.S. Pat. No. 5,182,518 to Stich, et al. entitled Inverter and Battery Testing for Uninterruptible Power Systems.

In uninterruptible power systems it is desirable to be able to regulate the output voltage over a wide range of AC input voltages without having to switch to inverter operation. For example, in a brown-out situation the AC input voltage may drop so as to cause AC output to fall below acceptable levels, while still providing some power to the load. One way to regulate such a voltage drop, without resorting to inverter operation, is to provide for multiple taps to the transformer primary connected to the AC power input. Each of the winding taps is provided with a tap changing switch. By connecting the AC input to the transformer through a selected one of the tap changing switches the UPS can regulate the output voltage despite swings in the input voltage without resorting to inverter operation. To provide relatively fine regulation over a large range of varying input voltages generally has required a large number of taps, tap switches, and associated switch control circuitry. By minimizing inverter operation, however, drain on the battery can be minimized, thereby increasing battery life.

In UPS systems of this type the transfer to battery power is initiated by a determination of the quality of the AC power system voltage. To achieve this determination the incoming line voltage waveform is usually monitored. When the line voltage is determined to be defective—that is, the line voltage is excessively noisy, the waveform is distorted, or power failure is complete—, back-up power is automatically supplied to the connected load by an inverter which is powered from the UPS batteries. Very often, especially in the case where primary AC power is derived from an AC generator, the incoming line voltage waveform is badly distorted, noisy, or unstable, resulting in many forced transfers from utility to battery power. However, many of these transfers may be initiated by poor wave shape or other non-critical anomalies which occur even when the incoming power waveform is adequate to power the loads without interruption. These often unnecessary transfers are undesirable and tend to deplete the batteries, so that when there is an actual power outage the batteries are not charged sufficiently to assure reliable back-up power for the designed back-up time. It is therefore desirable that the transfer mechanism be desensitized from those line distortions which are not indicative of power line failure. One method to overcome this problem is described in U.S. Pat. No. 5,229,651, to Baxter, Jr., et al., entitled Method and Apparatus for Line Power Monitoring for Uninterruptible Power Supplies. By this method a reference waveform, which is a composite of data from prior waveform cycles, is generated and is used in comparison with the incoming waveform to detect line faults. In U.S. Pat. No. 5,315,533 the comparison of the two waveforms is accomplished at high speed using a comparator circuit, and a selected allowable tolerance between the reference and the line voltage—a "line delta"—is employed to minimize unnecessary transfers to battery power.

A similar problem with noise arises at line voltage zero crossings. The line voltage zero cross signal is used by a UPS system for a variety of purposes, principal among which are system synchronization and line frequency determination. Line voltage waveform distortion and noise near the line zero cross can give rise to false zero cross indications. It is therefore desirable that a UPS system be able to distinguish a true line voltage zero cross from those resulting from waveform distortions. A typical solution in the prior art has involved the simple filtering of the line signal.

In UPS systems, batteries are one of the major causes of system failure. Battery performance can deteriorate due to the natural aging of the battery, and performance deterioration can be accelerated by using improper charging techniques, operating at excessive temperature, and allowing batteries to discharge below proper cell voltage for a long period. The latter condition leads to battery sulfation, which in some cases can be severe enough that the full battery capacity cannot be recovered.

For optimum charging it is desirable that the battery charger be able to charge in various modes. For example, for a heavily discharged battery, sulfation may have occurred and it is then necessary not only to charge the battery but also to equalize the cells, i.e., bring all cells to the same voltage and to desulfate these cells. This requires a controlled over-charge of the battery. It has also been determined, from automotive battery research, that for optimum battery life the batteries should be allowed to sit idle for much of their life. This requires a charger which will not float, or trickle charge, a battery to maintain the battery charge level once that proper level is reached. Furthermore, overcharging should be avoided as this can damage the battery. Battery chargers which can operate in multiple modes are known. What is desirable, however, is a battery charger with multiple modes of operation which allows for the charge profile to be easily tailored to the recommendations of specific battery manufacturers or to a user's preferred method.

SUMMARY OF THE INVENTION

An uninterruptible power system in accordance with the present invention is capable of providing regulated output voltages over a substantial range of input voltages without recourse to inverter operation. Further, the regulated AC input voltage can be used by the uninterruptible power system (UPS) to charge its battery using multiple charging modes. Both voltage regulation and battery charging are preferably controlled by a system controller incorporating a microprocessor. The UPS of the present invention modifies and conditions the line power by interaction with the AC input power. Under normal circumstances, the UPS primarily filters the power and consequently very little power is consumed. When the voltage becomes irregular, however, the UPS of the invention can augment the input power to keep the output within a normal range.

The present invention provides for regulation of the output voltage by provision of multiple taps on the primary winding of a main transformer, coupled with a buck-boost winding on the transformer. AC line power enters the UPS and, after having been filtered for electron-magnetic interference (EMI), passes through a selected tap of the primary and buck-boost windings of the transformer. The secondary windings of the transformer are, in turn, connected to the output of the UPS. The tap arrangement, coupled with the buck-boost winding, provides a cost effective way to achieve output regulation with the smallest size for the main transformer. By use of the buck-boost winding, the number of taps needed to achieve a given level of regulation is significantly less than would be required to achieve the same level of regulation without the buck-boost winding.

The input voltage to the UPS is preferably constantly monitored. The controller may compare this input voltage with a standard voltage curve which provides the allowable range of input voltages for the load equipment (e.g., a computer) to be connected to the output of the UPS. By analyzing the input voltage constantly, and comparing it to the standard curve, the controller can determine when to change the taps and the connection of the buck-boost winding to best fit the standard curve and to maintain the output voltage within desired ranges. The controller thereby determines which tap on the tap changer should be selected and whether the buck-boost circuit should be in buck, boost or pass-through mode. This decision is passed from the controller in the form of control signals to a decoding and drive circuit which drives relays in the tap and buck-boost circuit.

Tap switching is accomplished in coordination with the inverter to minimize disruptions to the output voltage waveform. When the controller determines that the AC input power is insufficient to provide adequate voltage to the output no matter which tap and buck-boost combination is selected, such as when the AC line input fails altogether, it sends a signal to open a static switch between the AC input and the main transformer. Simultaneously, the controller sends a control signal to turn on the inverter which then provides power from the battery to a second primary of the main transformer. This switch-over from AC line power to battery power is accomplished such that the voltage waveform seen on the secondary winding of the main transformer and at the output of the UPS is substantially unaffected.

Similarly, the switching of taps is accomplished by first interrupting the flow of power through the main power path using the fast static switch. The inverter is then turned on to supply power to the secondary of the transformer. The tap is then changed, the inverter turned off, and the static switch reenabled to resupply line power to the main power path through the newly selected tap of the transformer which the tap change has effected. Because the waveform provided by the inverter is synchronized to the input voltage waveform both before the static switch is opened up and before it is closed to reconnect power, there is essentially no glitch in the output voltage waveform provided to the load.

When the inverter is not providing power to the output, the auxiliary primary winding of the transformer, by which the inverter power is fed to the output, acts as an auxiliary secondary winding, providing power to a battery charger which is coupled through the transformer from whatever primary winding has been selected by the controller. As a consequence, the output voltage level across this auxiliary secondary is maintained substantially constant by virtue of the action of the tap changer and buck-boost circuit. The fact that the voltage provided to the charger is substantially constant facilitates control of the charger.

In accordance with the present invention there is also provided a method for minimizing unnecessary transfers to battery power which are caused by distorted incoming line voltage waveforms. This method adjusts the allowable tolerance between a desired reference voltage and the line voltage, the line delta, to provide the best compromise between battery usage and line quality. This method continuously adjusts the line fault sensitivity, by adjusting the line delta, based on the number of line fault occurrences in a specified interval of time.

In accordance with the present invention there is also provided a method and circuit for minimizing false line voltage zero crosses due to systematic or periodic as well as random distortions in the incoming line voltage. This method and device uses the input line voltage signal and a time delayed version of that signal to discriminate zero cross incidences which are the result of line voltage distortions from the true periodic zero crosses of the incoming voltage waveform.

In accordance with the present invention there is also provided a high frequency, multi-mode battery charger. The multiple modes are made possible by software control over the charger output. This software control allows the charge profile to be easily tailored to the recommendations of a specific battery manufacturer or a customer's preferred method of charging. The standard charge scheme may utilize the results of automotive battery research. It has been determined that for optimum battery life, batteries should be allowed to sit idle for much of their life. To accomplish this, the battery charger does not float, or trickle charge, the battery but brings it up to full charge and then ceases all charging. This allows the battery to rest and cool. In practice, since a DC bus will be supplying the power for many of the components of the system of which the battery charger is a part, the "float" voltage is set to a very low value which is approximately equivalent to the open circuit voltage of the battery. The charger set points are programmable in software, readily allowing selection of values that will configure the charger as a float, hysteresis, or three step charger. The charger can also provide a timed, periodic equalizing cycle such that the voltage applied to the battery is higher than a normal float voltage for a predetermined period of time to allow it to undergo a controlled over-charge. The purpose of this mode of operation is to allow those batteries (or battery cells), which are lower in state of charge to be brought up to a charge state equivalent to the others.

The charger relies on the relatively steady voltage level available at the input of the charger provided by the tap changing and buck-boost circuit. The availability of a controlled input voltage allows simplified control of the charger. The current in the charger is further controlled to follow the voltage of the AC power lines providing power to the charger, thereby presenting a substantially unity power factor to the AC power source. The charger also features a constant power output such that the charge current is greatest when the battery voltage is lowest.

Further objects, features and advantages of the invention will be apparent from the following detailed description when taken in conjunction with the accompanying drawings.

DETAILED DESCRIPTION OF THE INVENTION

Figure 1:
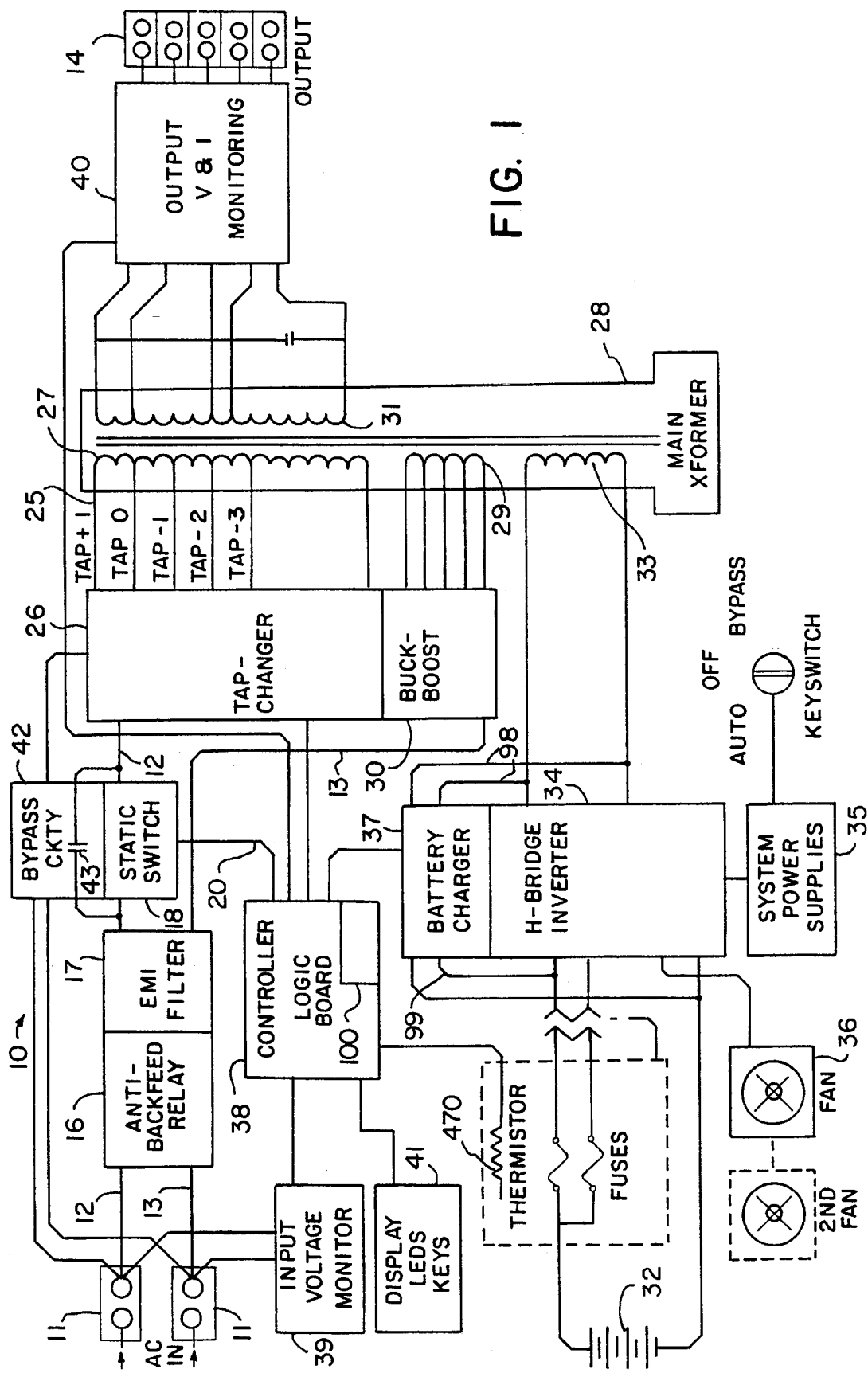
FIG. 1 is a block diagram of the uninterruptible power system of the present invention.

With reference to the drawings, a schematic block diagram of an uninterruptible power system providing voltage regulation and battery charging in accordance with the present invention is shown generally at 10 in FIG. 1. The uninterruptible power system (UPS) 10 receives AC power from an AC power source such as a commercial power system at input terminals 11, which are connected to main power path lines 12 and 13, and provides AC output power at output terminals 14. In operation the output terminals 14 will be connected to a load such as a computer system.

After entering the system the AC line power first flows through an anti-backfeed protection relay 16, and an electromagnetic interference (EMI) filtering circuit 17. The EMI filter 17 provides filtering of noise from line to chassis ground (the so called common mode noise, noise common to both sides of the line) and differential noise (from line to line), and dampens ringing on the line caused by line inductance. The anti-backfeed relays open when line power is not present, thereby providing galvanic isolation of the input terminals and the transformer primary to prevent voltage from being backfed onto the AC power system or the input terminals 11 while the inverter is operating.

Figure 7A:
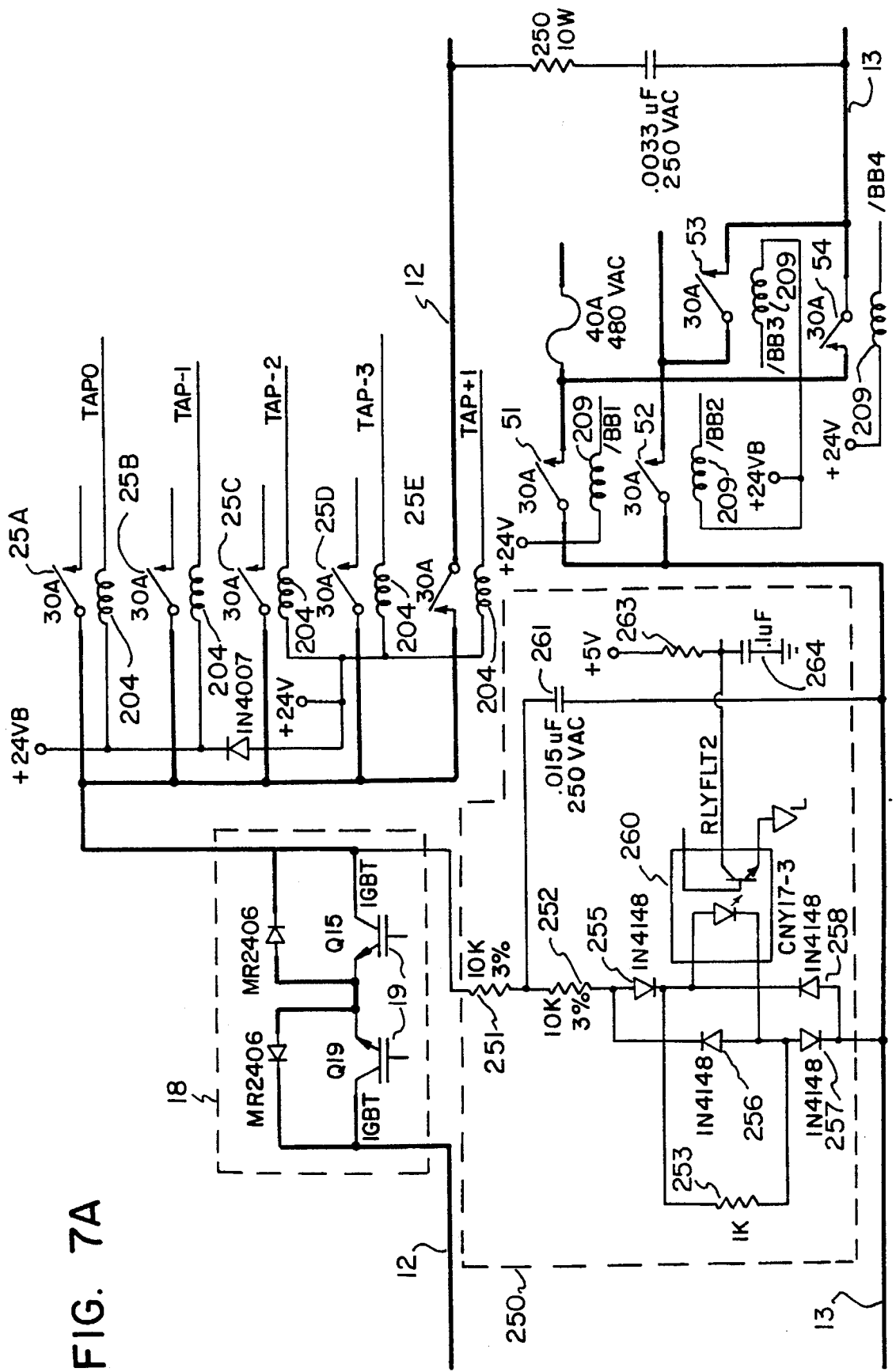
FIGS. 7A and 7B are schematic circuit diagram of the power flow control components and the relays in the static switch, tap changer, and buck-boost circuits.
Figure 7B:
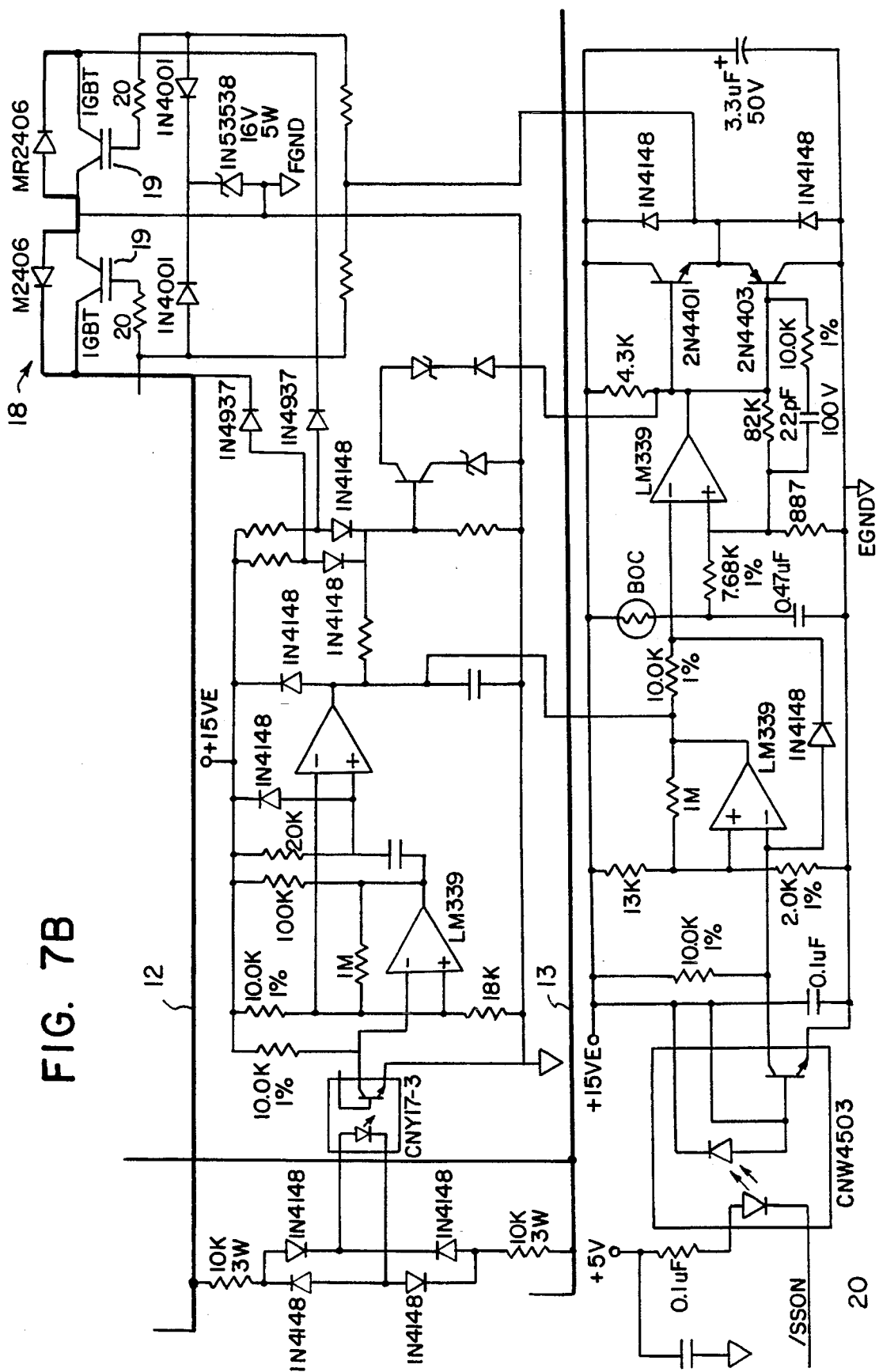

AC line power then flows through a static switch 18, for example, fast switching insulated gate bipolar transistor(s) (IGBT) 19 as illustrated in FIGS. 7A and 7B, which are driven by a driven and conduction limit circuit as shown in FIG. 7B. A signal/SSON on a line 20 provides control of turn-on and turn-off of the static switch. The static switch 18 is closed during normal AC line operation. It is opened when power is provided to the output from an inverter as described below.

The AC power then flows on the path lines 12 and 13 through one of several taps 25 leading to the primary winding 27 of a main transformer 28. The tap which is used is enabled by a tap changer circuit 26. The AC line power may also pass through a buck-boost winding 29 of the main transformer. Whether the winding 29 acts as a buck, boost, or pass-by is determined by the selected switching state of a buck-boost circuit 30.

By proper selection of the tap and buck-boost settings, the AC line input voltage passed through the transformer appears as a regulated voltage on secondary windings 31 of the main transformer 28. These secondary windings 31, in turn, feed the output terminals 14.

When the AC line input is disabled, and the static switch 18 is open, power is provided to the output terminals 14 from a battery 32 through an auxiliary winding 33 of the main transformer 28 acting as a primary winding. DC power from the battery 32 is transformed to AC power for the main transformer 28 by means of an inverter 34. Any conventional inverter topology and drive may be utilized. The inverter may comprise an H-bridge of power MOSFET's driven in a pulse-width-modulated manner, for example as described in U.S. Pat. No. 5,315,533, incorporated herein by reference.

When the system is being powered by the AC line input the auxiliary primary winding 33 of the main transformer 28 becomes an auxiliary secondary winding feeding AC power to a battery charger 37 which in turn charges the battery 32. Power is also provided through the winding 33 or from the battery for various system power supplies 35 and one or more cooling fans 36. The system power supplies 35 provide various levels of DC power (e.g., +15 V and +24 V DC) for the integrated circuits, switches, relays, etc. in the system. The designs for such circuits are conventional and widely known to these skilled in the art.

The entire UPS is monitored and controlled by a controller 38 the main component of which is a microprocessor 100 (illustrated schematically in FIG. 1). The microprocessor 100 monitors the state of the UPS by means of signals which it receives from a circuit 39 which monitors the input voltage and a circuit 40 which monitors the output voltage and current. The microprocessor 100 controls the UPS by means of control signals which it sends to the static switch 18 on the line 20, the tap changer circuit 26, the buck-boost circuit 30, the inverter 34, and the battery charger 37. Exemplary software for implementing such monitoring and control in the microprocessor is set forth in the accompanying microfiche appendix. It is also preferable that the microprocessor be able to receive input from and display output to the user via a user interface 41 containing display LEDs and input keys. The design and uses of such user interfaces are conventional and well known by these skilled in the art.

The input voltage line monitor 39 may be implemented using a line monitor transformer (not shown in FIG. 1) across the input lines 12 and 13 which steps down the AC input voltage signal to a level which can be used by the control circuitry for monitoring and metering the line. The monitor transformer also provides electrical isolation from the line for the control circuits. The transformer output is scaled, converted to a digital signal by an analog to digital converter (not shown) and provided to the microprocessor 100 in a conventional manner.

Similarly, the output voltage line monitor 40 may be implemented using a transformer whose primary is connected across the system output. A preferred transformer for this purpose is a Spitznagel SPK transformer rated at 230 volts primary and 28 volts secondary. The 28 volt secondary output of the transformer is scaled, converted to a digital signal, and provided to the microprocessor 100 in a conventional manner.

The output current monitoring may be implemented within the output monitoring circuit 40 using a current transformer located across a burden resistor which is in series with the output line. For example, a Hurricane HL-8560 current transformer with a 300 turn secondary winding and a 2 turn primary winding located across a 13 ohm burden resistor may be used. The output of the transformer secondary is scaled, converted to a digital signal, and provided to the microprocessor 100 in a conventional manner so that the output current may be monitored by the microprocessor 100.

It is also preferable that the UPS be provided with bypass circuitry 42 having a bypass relay 43. This circuitry is used to bypass the static switch and control circuitry of the UPS and provide power to the output when the static switch or the control circuitry has failed. It is preferable that the bypass mode of operation may also be entered into by user initiation. When the bypass circuitry is utilized it is desirable that the tap changer circuit 26 have some ability to determine which of at least two taps to the primary transformer winding should be used. Thus some regulation of the output voltage may be provided even in the bypass mode.

The present invention provides regulation of the output voltage despite variations in the AC input voltage and the utilization of the regulated output voltage to implement a multi-mode battery charger. The present invention may be incorporated in various uninterruptible power system configurations, such as that shown in the U.S. Pat. No. 5,315,533, the disclosure of which is incorporated herein by reference.

VOLTAGE REGULATION

Figure 2:
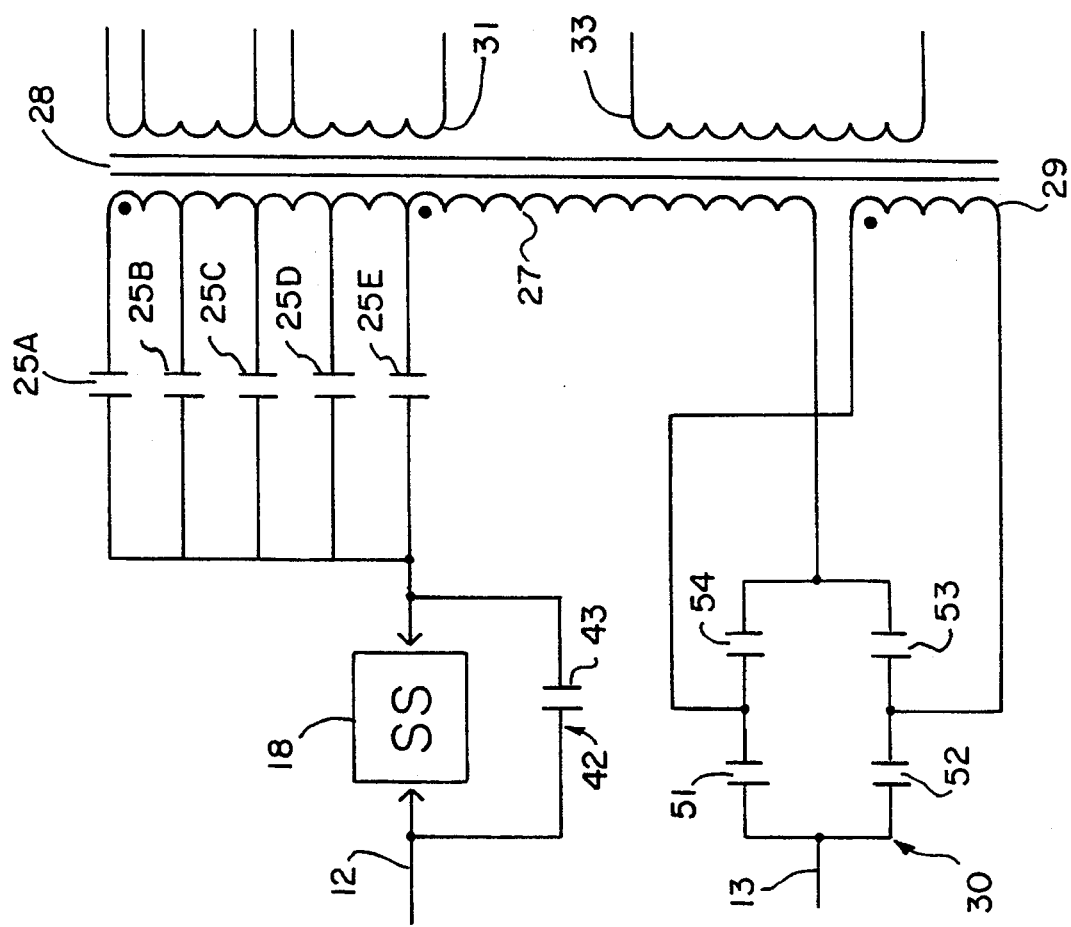
FIG. 2 is a schematic circuit diagram of the main transformer showing the relay connections to the primary windings of the transformer.

The basic circuit for regulating the output of the UPS 10 with respect to the AC line input is shown in the circuit diagram of FIG. 2. AC line input voltage, which has already passed through the anti-backfeed relay 16 and EMI filter 13, passes through the static switch 18 on the line 12 to one of several tap relay switches 25A–25E. Each tap relay switch is connected to the primary winding 27 of the main transformer 28. AC line input power then flows through the buck-boost circuit 30 and through the buck-boost winding 29 of the main transformer. The AC input terminals 11 are thereby coupled to the AC output terminals 14 through the secondary winding 31 of the main transformer 28. The auxiliary (inverter) winding 33 of the main transformer 28 and the bypass relay 43 are also shown for reference in FIG. 2.

Regulation of the output voltage is achieved by closing one of the tap relay switches 25A–25E and by closing a combination of relay switches 51–54 in the buck-boost circuit 30 so as to create a buck, boost, or pass-by state in the circuit. When relay switches 52 and 53, or 51 and 54, or all four relay switches, of the buck-boost circuit are closed, no current will be applied to the buck-boost winding 29 and the current from the primary 27 will pass straight through the buck-boost circuit, providing a "normal" turns ratio between the primary 27 and the secondary 31, with the actual turns ratio dependent upon the particular top relay switch which is closed (e.g., 1:1). When relay switches 54 and 52 in the buck-boost circuit 30 are closed, current passes through the buck-boost winding 29 in the same direction as through the primary windings of the transformer to thereby aiding the primary winding flux and providing a bucking action or lower output voltage because of the lower than normal secondary to primary turns-ratio. When the relay switches 51 and 53 of the buck-boost circuit 30 are closed the circuit acts as a boost circuit, with the current through the buck-boost windings 29 running in the opposite direction as the current in the primary winding 27 and opposing the primary winding flux to provide a higher effective secondary to primary turns ratio.

For exemplification, five main taps are shown in FIG. 2 which are spaced, e.g., about 27 volts apart. For such an arrangement, if the buck-boost winding is rated at 9 volts, ignoring hysteresis, it can be shown that the output resolution is about 9 volts over a range of about 136 volts. With a nominal minimum output of 200 volts (rms), centered in the 9 volt window, the lowest voltage out is 200 V−4.5 V=195.5 volts, corresponding to a regulation capability of better than 3 percent. The tap arrangement, coupled with the buck-boost winding, thus provides a cost effective way to achieve such regulation with the smallest size for the main transformer. Without the buck-boost winding, 15 taps and 15 relays would be needed to achieve the same degree of regulation as the 5 taps, one buck boost winding, and 9 relays of the circuit of FIG. 2.

The decision regarding which tap to use and which mode the buck-boost circuit 30 is to be set in is made by the microprocessor 100 under program control. The microprocessor 100 (e.g., a Siemens 80C166) has read only memory (ROM), random access memory (RAM), oscillator clocks and control circuitry associated with the microprocessor in a conventional fashion. Such microprocessor controller systems are conventional and well known in the art. During normal AC line operation the microprocessor 100 analyzes the output voltage of the UPS, compares it to a programmable regulation limit, and uses an integration process to determine when to change the taps to maintain the output voltage within the desired range.

At every positive zero cross of the incoming power line voltage, the root-mean square (rms) output voltage is preferably computed. This may be carried out by the microprocessor 100 by sampling the output of the output voltage line monitor 40 over the previous cycle and performing the rms calculation over the cycle after all the samples have been gathered.

Preferably, this is carried out by computing the sum of the squares of the calibrated sampled voltage for one cycle of the sampled voltage. This value represents a linear transformation (in the sense of the principle of superposition) of the true rms quantity of the measured voltage as shown below.

The formula for evaluating an rms value of a signal "x":

$$rms = \sqrt{\frac{1}{T}\int x^2 dt}$$

where: T is the period.

In discrete form, this is expressed as:

$$rms = \sqrt{\frac{1}{T}\Sigma x_i^2 * \frac{T}{n}} \quad i = 0, 1, \ldots n-1$$

where: n is the number of samples per period, T.

Rearranging, simplifying and squaring both sides gives:

$$rms^2 = \frac{1}{n}\Sigma x^2$$

The squaring is, in a sense, a transformation, so that calculations in real-time can be made in the transformed domain, or "squared" domain. Results of the calculations will have much higher accuracy than calculations using the square roots of these quantities; and this method executes much faster in software since the square root function is somewhat time intensive. The computed value is used to determine trip points and other quantities that require high precision, such as the tap regulator trip points and the CBEMA curve regulation, as explained below, and no further processing need be done on the sum of squares. The trip points are pre-calculated according to what the value of the sum of the squares of the calibrated samples should be for the rms quantity desired. Action is based on a comparison of the pre-calculated trip point with the real-time summation of the squred samples for one cycle of the ac quantity being measured; similarly, the CBEMA curve switching are preferably accomplished using constant rms quantities transformed to the calibrated sum of squares format so they can be utilized with the real-time sum of squares information for each line cycle of the rms quantity being measured.

The input voltage and output voltage are preferably transformed in this manner and these quantities may also be square-rooted for metering purposes. For other AC parameters, the complete square root may be taken. The square root is completed for the purpose of metering and algorithm decisions that do not require high speed or high accuracy, and are generally better handled as an average rms over many line cycles. Metering is done, e.g., approximately every 250 milliseconds.

The microprocessor 100 compares the computed rms output voltage with a programmable regulation limit, designated in Equation 1 below as "Vlolim". If the computed voltage falls below the regulation limit an integration algorithm operates on the ratio of the rms value of the regulation limit to the rms value of the computed output voltage. The algorithm establishes a rated number for that particular cycle of output voltage. On consecutive cycles, if the voltage is again below the regulation limit, another rated number is calculated and summed with the previously computed weights. When the sum of the calculated weights reaches an integration constant, a tap change is implemented. This procedure is represented mathematically in Equation 1 where Vlolim is the regulation limit, $Vout_n$ is the nth cycle rms voltage, and K is the integration constant. The integrator summation is reset at each request for a tap change and each time the UPS transfers to inverter power.

$$IF\ \Sigma \left(\frac{Vlolim}{Vout_n}\right)^4 > k\ THEN\ select\ new\ tap. \quad (1)$$

The summation algorithm is designed to follow a curve fitted to the Computer Business Equipment Manufacturers Association (CBEMA) computer susceptibility time versus voltage guideline. The CBEMA curve is illustrated with reference to FIG. 3. The CBEMA steady state lower limit 70 is 13% below nominal line voltage 71. It is preferable, however, to use a steady state lower limit, Vlolim, of 3% below nominal 72 to allow less susceptibility to line anomalies, that is, greater protection for critical loads, than is required by the CBEMA standard. At the same time, the value of Vlolim should not be set too close to nominal line voltage in order to insure that nuisance tap switching is mitigated, thus preserving battery energy and minimizing acoustic noise. As curves 70 and 72 show, the system will tolerate a steady state output voltage below the nominal line voltage but higher than the lower limit for an infinite number of cycles. However, a steady state output voltage below the lower limit will only be tolerated for a limited number of cycles before a tap change is ordered. The further that the output voltage is below the nominal voltage the fewer cycles for which this abnormal voltage will be tolerated. For example, using the standard CBEMA curve 70, an output voltage 30% below nominal line voltage will only be tolerated for 0.5 seconds; an output voltage at 42% below nominal line voltage, however, will only be tolerated for 0.1 seconds before a tap change is ordered. It can be seen that this curve is reflected in Equation 1, the summation will exceed the constant, and thereby order a tap change, in fewer cycles when the ratio of Vlolim to $Vout_n$ is largest, that is, when the output voltage is farthest below the low voltage limit.

Where the output voltage rises above the lower regulation limit, Vlolim, but is lower than a programmable high regulation limit, Vhilim, an arbitrary and relatively large constant amount is subtracted from the summation. This is justified because of the nature of switch mode loads containing a diode bridge. A switch mode bus will accumulate charge much faster than it will be depleted of charge by its loads. Given that such a bus is below its nominal DC value, once line voltage recovers the diodes will conduct heavily. Therefore, complete switch mode bus recovery is achieved in a small number of cycles. This procedure is expressed mathematically in Equation 2 where Vlolim is the lower steady state limit of regulation, Vhilim is the high regulation limit, $Vout_n$ is the nth cycle rms voltage, and $K_1$ is a constant approximately equal to K/6.

IF Vhilim ≧ $Vout_n$ ≧ Vlolim THEN $$\Sigma \left(\frac{Vlolim}{Vout_n}\right)^4 = \Sigma \left(\frac{Vlolim}{Vout_n}\right)^4 - k_1 \quad (2)$$

On the high side of nominal system voltage the CBEMA curve is relatively flat, tolerating only short durations of over voltages. Consequently, the tap switching algorithm tolerates only 4 cycles of over-voltage and then computes a new tap. Once again, it is preferable to use a high voltage regulation limit 76 at 3% above nominal (the CBEMA standard 75 is 6%). If the computed rms output voltage exceeds the high voltage regulation limit, Vhilim, for more than 4 cycles consecutively, the tap changer regulation system will implement a tap change.

Figure 3:
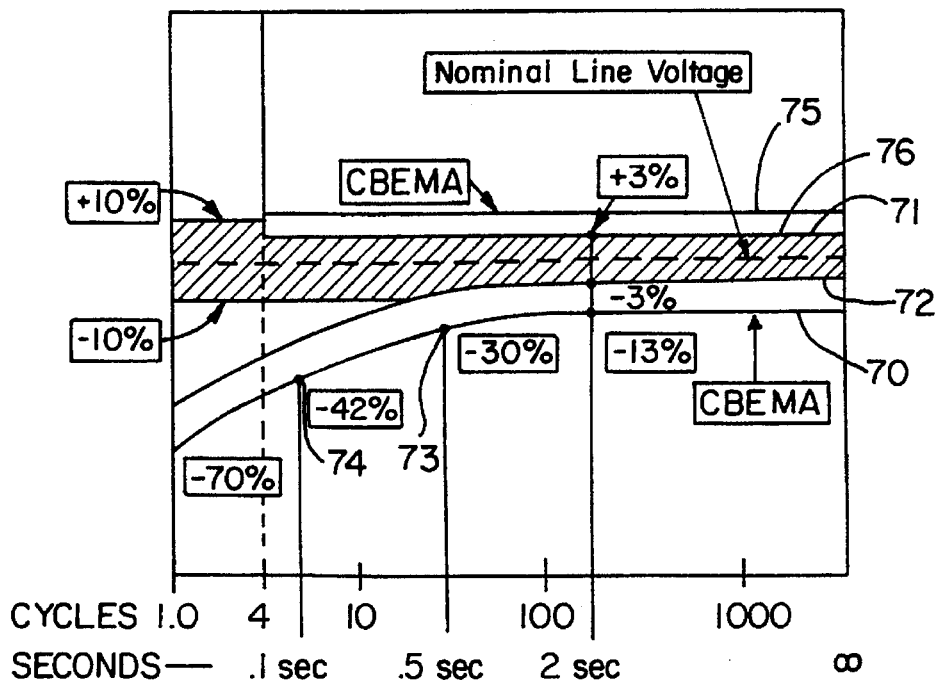
FIG. 3 is a graph representing the Computer Business Equipment Manufacturers Association (CBEMA) computer susceptibility time versus voltage guideline curves.

It should be noted that it is preferable that the decision concerning when to implement a tap change, as described above, is made separately from the decision of when to switch from line to inverter operation. The decision to switch to inverter operation is preferably implemented through the use of an adaptive line fault detection system which is described below. This system can supersede the integration algorithm which makes the tap change decision. Therefore, in circumstances where a transient causes a voltage deviation that is within the Vlolim/Vhilim boundary, but not within the tolerance of the adaptive line fault line detection system, the latter will cause the system to switch to inverter, thereby preempting the action of the tap regulator. By use of the tandem regulation mechanisms, the rms regulation characteristics, as depicted in FIG. 3, can be maintained.

It is also preferable that the decision concerning when to implement the tap change be superseded by checking for a low battery condition. As is described below, the inverter is used during tap switching operations. Since the inverter uses battery power it is preferable not to attempt a tap switching operation when a low battery condition is sensed. In this case, it is preferable that the currently used tap combination should be locked in until the battery recovers.

Once the microprocessor 100, using the integration procedure described above, has made the determination that a tap change is required, the selection of which tap and buck-boost combination is required to bring the output voltage to within the programmable regulation range is computed using the most recent cycle's rms output voltage. This voltage may be computed within microseconds of when the decision to change taps is indicated in the manner as described above. The method of computing an appropriate tap and buck-boost combination implicitly considers the dynamic line impedance present at the time the tap changing decision is made. Line impedance and system impedance are implicitly factored into the calculation by using output voltage in the tap selection equation. The output voltage is an implicit function of those impedances and the presently used tap buck-boost combination that is active when the voltage measurement is made. Consequently, the selection can be accurately made without knowing the impedances explicitly, given that line impedance does not change during the few cycles required to implement the tap change.

The proper tap and buck-boost configuration can be easily calculated by recognizing the fact that each such combination represents an effective primary/secondary turns ratio. As such, when a tap change is indicated, the new effective turns ratio can be simply and precisely computed according to Equation 3, where NewRatio is the effective turns to ratio that will bring the output voltage to within the regulation range, Vout is the system output voltage, OldRatio is the effective turns ratio that is activated when the equation is evaluated, Vhilim is the upper steady state limit of output voltage regulation, and Vhysterisis represents a number of volts below the upper limit of regulation which is used to reduce the probability of oscillation between taps.

$$\text{NewRatio} = 1 + \frac{\text{Vout*OldRatio} - (\text{Vhilim} - (\text{Vhysterisis})}{(\text{Vhilm} - \text{Vhysterisis})} \quad (3)$$

After a new effective turns ratio is calculated using Equation 3, the microprocessor 100 selects as the new tap configuration that configuration whose effective turns ratio is the next largest to that calculated in Equation 3.

For ease of calculation it is preferably that each tap buck-boost combination—that is, each effective turns ratio—be given a number, where each number represents a virtual tap. For example, virtual tap 0 may represent an effective turns ratio of 1. Virtual tap+1 would then indicate the tap combination representing the next highest effective turns ratio. Similarly, virtual tap−1 would represent the tap combination whose effective turns ratio is the next one below that of virtual tap 0. The difference in the effective turns ratio between each virtual tap determines the degree of regulation. In the example given above, where there are five main taps in addition to the buck-boost circuit providing 3% regulation over a range of about 136 volts, there would be 15 virtual taps, each separated by an effective turns ratio of 0.037. With such a virtual tap numbering scheme a new virtual tap can be simply and precisely computed according to Equation 4 below where NewTap is the virtual tap that will bring the output voltage to within the regulation range, Vout is the system output voltage, OldTap is the virtual tap that is activated when the equation is evaluated, Vhilim is the upper steady state limit of output voltage regulation, Vhysterisis represents a number of volts below the upper limit of regulation which is used to reduce the probability of oscillation between taps, and TapRatio is the effective turns ratio separating each virtual tap. Note that Equation 4 is a reformulation of Equation 3.

$$\text{NewTap} = \frac{\text{Vout*}(1 + \text{TapRatio*OldTap}) - (\text{Vhilim} - \text{Vhystersis})}{\text{TapRatio} * (\text{Vhilim} - \text{Vhysterisis})} \quad (4)$$

The algorithms described above are used to select taps when a tap change is required while the UPS system is in its line-interactive mode and receiving AC power at the input terminals 11. A different procedure is required for selecting which tap will be used when the system is switched from inverter back to line power. The algorithm used to select taps when UPS is on inverter and a transfer to line power is approaching is different because the output voltage in such a case is not likely to be an explicit function of the line and system impedances, but rather is regulated by inverter voltage control. Under these circumstances, a tap is chosen by roughly estimating the system voltage drop that should occur once line power is applied. This voltage drop will be load dependent, and may be determined by means of the output current parameter as generated by the output current monitor 40. The most recent cycle's rms input voltage is also required for determining the proper tap combination. Given the output current and input voltage values, an effective turns ratio for the tap buck-boost combination can be determined by means of Equation 5 below, where NewRatio is the effective turns ratio that will bring the output voltage to within the regulation range, Vin is the system input voltage (line voltage), VoutNominal is the desired output voltage rating, Iout is the output current, and XfmrRes is a factor which roughly compensates for impedance drops within the UPS.

$$\text{NewRatio} = \text{Vin} \times \left( V_{hilim} + \frac{\text{Iout}}{2^{XFmrRes}} \right)^{-1} \quad (5)$$

Alternatively, given the virtual tap numbering scheme described above, a virtual tap can be chosen which places the output voltage within regulation limits by means of Equation 6 below, where NewTap is the virtual tap that will place the output voltage within the desired range, Vin is the system input voltage (line voltage), VoutNominal is the desired output voltage rating, Iout is the output current, XfrmRes is a factor which roughly compensates for impedance drops within the UPS, and TapRatio is the effective turns ratio separating each virtual tap.

$$\text{NewTap} = \frac{\text{Vin}}{\text{TapRatio}} * \left( V_{hilim} + \frac{\text{Iout}}{2^{XFmrRes}} \right)^{-1} - \frac{1}{\text{TapRatio}} \quad (6)$$

The solution to the equation is rounded up to determine the virtual tap number which will be used. If the estimate made by this algorithm proves incorrect once the transfer to line operation is made, the tap selection will be corrected by the very precise line interactive algorithm described above which will be in effect after the transfer.

It is preferable that parameter XfmrRes be programmable. This parameter is a course representation of UPS system impedance and is UPS rating dependant. Programmability allows user compensation for the UPS rating as well as for the line impedance conditions at an installation site. This parameter can be used to cure oscillation problems that will occasionally occur with very soft line impedances operating at the lower limit of allowable input voltage. These problems can occur because of the limitations of Equation 5 in predicting the effect of line impedance on regulation.

Once a tap configuration is computed by the microprocessor 100 the tap change process begins. The inverter is used during tap switching operation to insure dry switching of the tap relays. Tap regulation transfers from line to inverter, and vice versa, will occur at line voltage zero crosses. This is so that no instantaneous step discontinuities, i.e., glitches, will be apparent in the output voltage waveform at the time of transfer.

It is preferable that each tap configuration have a unique binary representation stored in the microprocessor 100 program memory which may be used as the tap configuration control signal. For example, for the UPS with 5 primary taps in addition to the buck-boost circuit a 3-bit code may be used to select one of the primary taps and a 2-bit code may be used to select the proper buck-boost state.

Figure 4A:
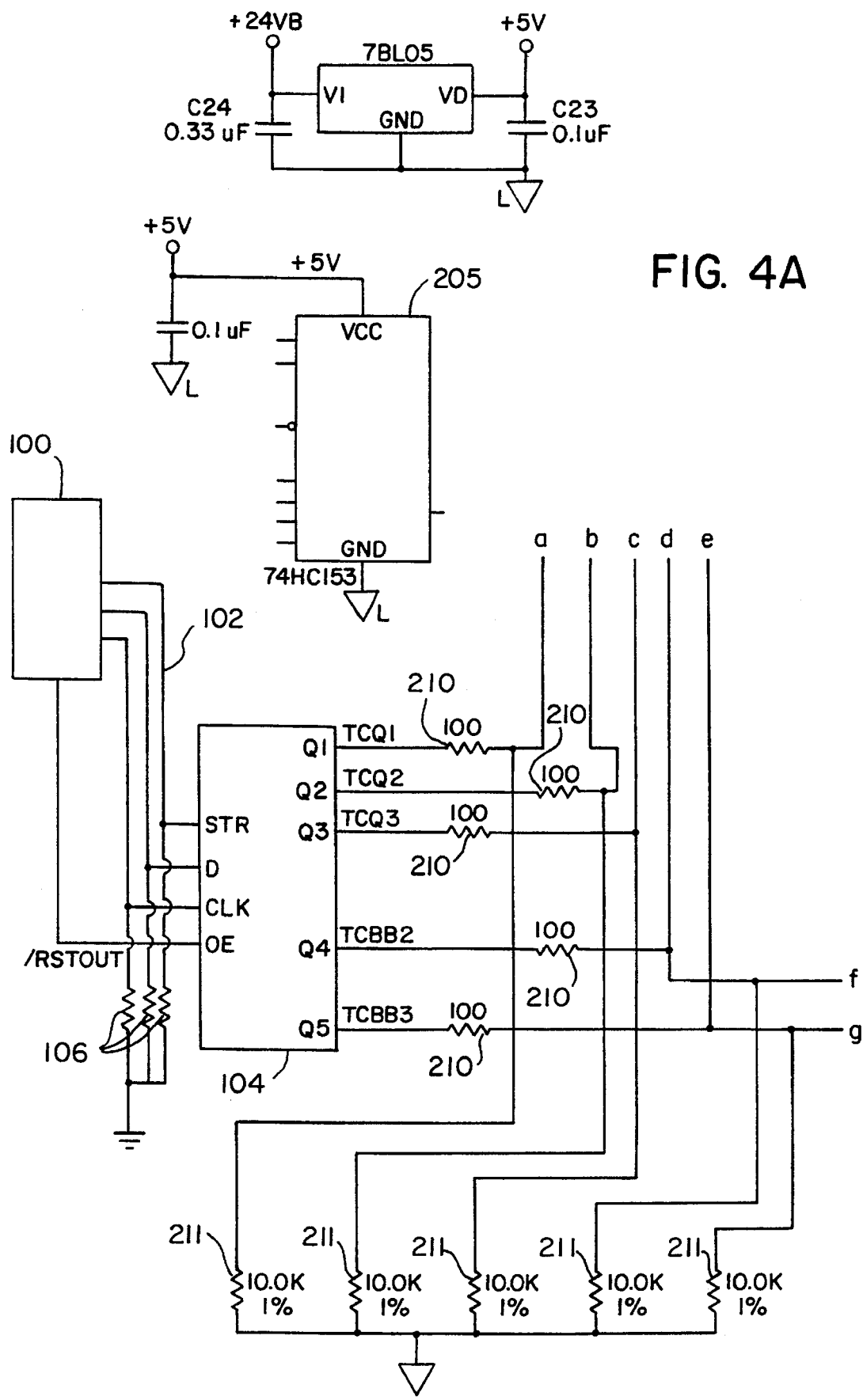
FIG. 4 is a schematic circuit diagram showing the relay decoding and drive circuits.
Figure 4B:
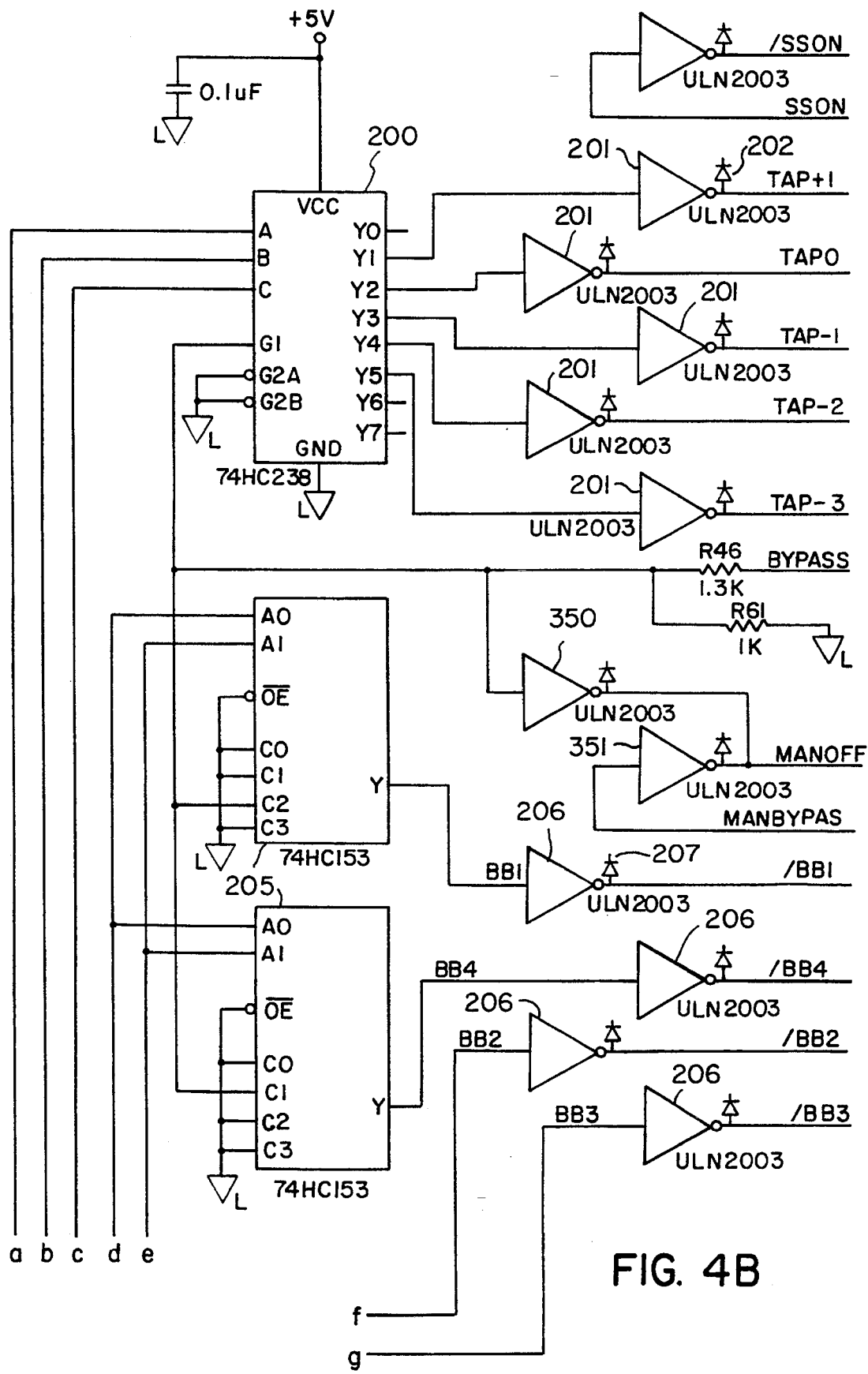

As is shown in FIG. 4, the tap configuration control signal is communicated from the microprocessor 100 serially, via a three-wire interface 102, to a latch 104 which does a serial to parallel conversion, in this case, of the 5-bit binary control data. The microprocessor 100 controls the sequencing and strobing of the data to the latch 104 by means of a software algorithm. Pull down resistors 106 are used to guarantee a stable LOW state during power supply startup. The signal/RSTOUT disables the outputs of the latch 104 until the microprocessor 100 is initialized, or upon failure of the logic power supply.

The latch 104 produces five parallel control signals. Three of the control signals, TCQ1, TCQ2, and TCQ3, are used to select one of the primary taps 25–25E. Table 1 below shows the relationship between the state of the control signals and which tap will be selected.

TABLE 1

| TAP SELECTION CONTROL SIGNALS | | | |
|---|---|---|---|
| | Control Signal | | |
| Tap Selected | TCQ3 | TCQ2 | TCQ1 |
| Tap +1 | LOW | LOW | HIGH |
| Tap 0 | LOW | HIGH | LOW |
| Tap −1 | LOW | HIGH | HIGH |
| Tap −2 | HIGH | LOW | LOW |
| Tap −3 | HIGH | LOW | HIGH |

The other two control signals, TCBB2 and TCBB3, determine the state of the buck-boost circuit. Table 2 below shows the relationship between the state of the buck-boost circuit control signals and the corresponding state of the buck boost circuit.

TABLE 2

| BUCK-BOOST CIRCUIT CONTROL SIGNALS | | |
|---|---|---|
| | Control Signal | |
| Buck-Boost Circuit | TCBB3 | TCBB2 |
| Buck | HIGH | LOW |
| Pass-by | HIGH | HIGH |
| Boost | LOW | HIGH |

The tap changer and buck-boost circuit control signals are fed from the latch 104 to a circuit which decodes the signals and drives the primary tap relays 25A–25E and buck-boost relays 51–54. Decoding of the control signals is done to insure that illegal relay configurations cannot be physically activated due to control signal corruption to avoid a shorted winding, which might be caused, for example, by inadvertent selection of two taps simultaneously.

Decoding and relay drive for primary tap changing is accomplished through a 3-line to 8-line decoder 200. When the enable pins at G2A and G2B are LOW and the enable input at G1 is HIGH, the input lines A, B and C act as address lines with one of the outputs Y0 through Y7 going HIGH depending upon which address is selected. For example, if A, B and C are all LOW decoder output Y0 will be HIGH. If only input line A is HIGH, output Y1 will be selected to be HIGH. Only one output line can be HIGH at any one time.

The decoder 200 decodes the tap selection data by a direct decimal interpretation of the tap control signals, TCQ1, TCQ2, and TCQ3, which are connected to input lines A, B, and C, respectively and are protected by series resistors 210 and pull down resistors 211. For example, when TCQ1 is HIGH and TCQ2 and TCQ3 are LOW Y1 will be selected to be HIGH. This corresponds to a selection of tap+1, as indicated in Table 1. Since only one output can be HIGH at any one time a shorted winding due to a corrupted control signal is impossible.

Figure 5:
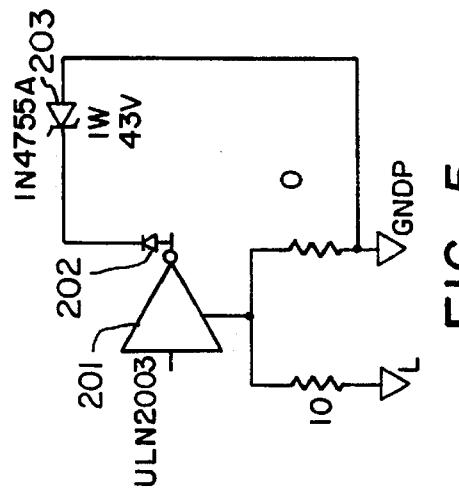
FIGS. 5 and 6 are schematic circuit diagrams of driver connections for driving the relays.

A HIGH output from the decoder will cause one of the drivers 201, which are essentially Darlington transistors, to conduct. These drive signals, in turn, pass through selected one of relay coils 204 to cause the selected one of the relays 25, as illustrated in FIG. 15, to close. Flyback energy from the collapsing field of the relay coil is shunted to the supply ground by virtue of an intrinsic diode 202 and a Zener diode 203, as shown for each of the drivers 201 in more detail in FIG. 5.

The buck-boost relay control signals (TCBB2 and TCBB3) are decoded using 4-line to 1-line demultiplexers 205 in parallel with the control signals themselves. This decoding produces four drive signals, BB1–BB4, which operate the buck-boost relays, 51–54 respectively. To prevent a shorted winding in this tap section it is necessary to guarantee that neither relays 51 and 52, nor relays 53 and 54, are simultaneously activated.

The demultiplexer 205 will output the signal level that is present on the input which is selected by the address presented to it. For example, assuming that the demultiplexer is enabled (in this circuit the demultiplexers are permanently enabled as the/DE pin are wired permanently to logic ground), if both A0 and A1 are LOW then the signal at C0 is passed to the output. Similarly if A0 is HIGH and A1 is LOW the signal at C1 is passed to the output. The buck-boost control signals TCBB2 and TCBB3 are paralleled as address lines to the demultiplexer 205 and direct inputs to buck-boost relay drivers to provide fail safe control of the buck-boost winding relays 51–54 to prevent a shorted winding.

Relays 52 and 53 are activated directly by the tap control signals TCBB2 and TCBB3, respectively. These two control signals thus correspond to buck-boost relay drive signals BB2 and BB3 respectively. The relays are selected when the corresponding control signal is HIGH. The two control signals are also fed to the address line inputs of the demultiplexer 205 and are protected by series resistors 210 and pull down resistors 211. The control signals thus select which one of the input values of the demultiplexer 205 will appear at the output of the demultiplexer 205. The outputs of the demultiplexers 205, in turn, are used to activate relays 51 and 54 by producing buck-boost drive signals BB1 and BB4 respectively.

Most of the inputs to the demultiplexers 205 are wired to ground. In the demultiplexer driving relay 51, however, input C2 is connected to the signal BYPASS. Similarly, in the demultiplexer driving relay 54 the input C1 is connected to the BYPASS signal. (The function of the BYPASS signal will be discussed in more detail below.) For normal operations the BYPASS signal is HIGH. By the use of this decoding scheme it is clear that neither relays 51 and 52, nor relays 53 and 54, could be simultaneously selected. For example, if TCBB2 is HIGH then relay 52, which that control signal directly controls, is active. But a HIGH TCBB2 signal on the demultiplexer 205 producing the relay 51 activation signal means that either C1 (if TCBB3 is LOW) or C3 (if TCBB3 is HIGH) will be selected. Since both C1 and C3 are connected to ground, however, it is clear that the output of the demultiplexer 205 will be LOW and relay 51 will be deactivated. This fail safe decoding for normal operations is summarized in Table 3.

TABLE 3

Buck-Boost Control Signal Fail Safe Decoding
(Normal Operations)

| Control Signal | | Relay Drive Signal | | | | |
|---|---|---|---|---|---|---|
| TCBB3 | TCBB2 | BB1 | BB2 | BB3 | BB4 | Buck-Boost Mode |
| LOW | LOW | OFF | OFF | OFF | OFF | OFF |
| LOW | HIGH | OFF | ON | OFF | ON | BOOST |
| HIGH | LOW | ON | OFF | ON | OFF | BUCK |
| HIGH | HIGH | OFF | ON | ON | OFF | PASS-BY |

Figure 6:
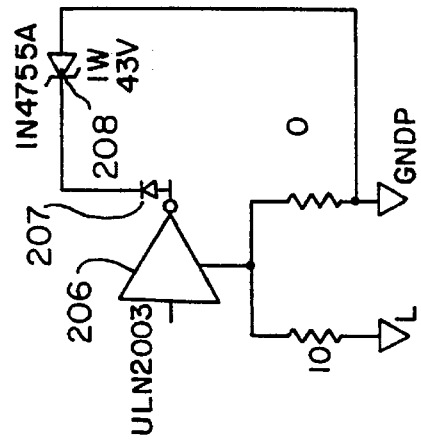

The drive signals, BB1–BB4, resulting from the decoding of the buck-boost control signals, TCBB2 and TCBB3, as discussed above, are fed to buck-boost relay drivers 206. HIGH inputs to the buck-boost relay drivers 206, which are essentially Darlington transistors, cause them to conduct to provide current to a selected one of the buck-boost relay coils 209. This, in turn, causes the selected buck-boost relays 51–53, as shown in FIG. 7A, to close, creating either a buck, boost, or pass-by connection of the buck-boost winding. Flyback energy from the collapsing coil fields of the relay coils 209 is shunted to the supply ground by virtue of an intrinsic diode 207 and Zener diode 208, as shown for each of the drivers 206 in more detail in FIG. 6.

The tap change process takes several line cycles to complete. This is because each time a new tap configuration is selected it is preferable that diagnostics on the tap changing system be performed. This insures that transformer windings are not inadvertently shorted or left open by mechanical or electrical circuit failure, thereby leaving the critical load without power.

The hardware portion of a preferred diagnostic sensing system is shown generally at 250 in FIG. 7A. Resistors 251, 252, and 253 form a voltage divider connected across the line, with one end connected at the input to the primary tap switches 25A–25E, and the other end is connected to the output of the buck-boost circuit 30. Resistor 253 is inside a diode bridge formed by diodes 255–258. The diode bridge allows sensing in either polarity of the line voltage signal, and the resistor 253 discharges the intrinsic capacitance of the diode bridge. In parallel with resistor 253 is the diode of an optocoupler 260, which is used for galvanic isolation of the tap diagnostic system's logic circuit from the high voltage power circuits. The voltage divider is used for current limiting, to protect the optocoupler's 260 diode. Resistors 251 and 252 do the bulk of the current limiting and form an RC filter, in conjunction with capacitor 261, that attenuates any inverter noise which may be coupled through the power transformer. When there is sufficient voltage across the line current flows through the resistors 251–253, and is rectified by the diode bridge so as to flow through the optocoupler 260 diode, thus turning on the optocoupler's 260 output transistor. The output of the optocoupler 260 is pulled down to approximately 0.3 volts if the diode current is sufficient. This output is a signal, RLYFLT2, which is connected to the microprocessor 100. This signal is also connected to an RC network formed from resistor 263 and capacitor 264. The purpose of the RC network is to limit the rate of rise of the logic signal to the microprocessor 100 so that larger value resistors can be used in the divider circuit. Larger valued resistors reduce the power handling demands on the divider, but also reduce the diode current so that the transistor turns off for a larger portion of the line cycle. The RC circuit compensates for this and is necessary since certain instances of diagnostic probing of the relay fault circuit occur at the line zero cross. Thus the RC circuit keeps RLYFLT2 at logic LOW when there is normal AC current across the diagnostic circuit even though the transistor is constantly oscillating on and off.

The function of this diagnostic sensing circuit is to sense both the presence or the absence of voltage available to the tap relays. Which condition is appropriate depends on which stage of the diagnostic sequence the tap changer is executing, and either shorted winding conditions or open winding conditions can be inferred. The transfer process can thus be terminated by the microprocessor 100 if an inappropriate voltage response is sensed, and the system will continue to operate on inverter, since inverter power is used during a tap transfer.

It is preferable that each time switching of a tap switch occurs, whether during line interactive operation or upon inverter to line transfers, the microprocessor 100 performs fault diagnostics on the tap system. The diagnostics are preferably accomplished in two stages. First a fundamental error checking routine is executed sequentially at negative going line zero crosses during the several line cycles that elapse during the tap change sequence. At each zero cross a different portion of the fundamental diagnostic is performed. Second, if an error is found in the fundamental error checking routine, an extensive diagnostic is run. This diagnostic is also executed sequentially at negative going line zero crosses over many line cycle periods.

For the latter tests especially, it is preferable that a multi-cycled delay be used to slow down the rate at which the test is accomplished and through which the relays are activated. Although the diagnostics can proceed at a much faster rate the acoustic sound of a high rate switching of the relays might be interpreted by a user as a catastrophic event in the UPS. The slower rate has a synchronous deliberate sound.

During any tap switch operation line power is disconnected from the output by means of the static switch 24 and the system runs on battery power. Since the diagnostics require multiple line cycle delays in order to account for relay operation times, the diagnostics are split into the two sections listed above to minimize the time on inverter and to minimize the total number of operations of the relays.

Basic diagnostics are performed by checking for voltage between the static switch 24 and the major taps of the primary winding 27 at predetermined critical times. The test is accomplished by software polling the RLYFLT2 signal. If this signal is LOW, voltage is present. The presence of voltage indicates the state of continuity of the tap circuit. The timing of the diagnostic tests are determine by software. The diagnostic sequence relies on the assumption that a tap system failure would be a single point failure.

After the decision to make a tap change is made the inverter 34 is turned on and the static switch 18 is opened allowing all major tap and buck-boost relays to deenergize. Adequate time is allowed to elapse to account for tap relay operation time. Preferably this time is programmable from one to several line frequency cycles. After this time has elapsed voltage should not appear at the fault circuit node, the RLYFLT2 signal should be HIGH, since all relays and the static switch are open. If voltage is sensed a welded or shunted tap fault condition is detected. The tap sequencer algorithm should repeat this particular step two or more times in order to verify the condition. If it is verified, the system should remain on inverter until automatically or manually shut down. In such a case the system should usually not be allowed to return to normal operations until a shunted tap fault condition flag is reset, usually by service personnel after the system has been analyzed and repaired.

If no fault condition is detected at this stage the buck-boost tap configuration chosen by the software tap selection algorithm is closed. After allowing adequate time for relay operation, continuity at the fault detection mode is tested. Voltage should not be present as complete continuity should not yet be established. If continuity is present, software will indicate a shunted major tap condition. Once again, verification should be performed.

If the test sequence so far has passed without the detection of an error the major tap chosen by the software tap selection algorithm is closed. After allowing adequate time for relay operation, continuity at the fault detection node is tested. Complete continuity should now be established. The voltage at the fault detection node will be the result of a complete primary winding appearing across the fault detection circuit. If the microprocessor 100 sees that no voltage is present at the fault detection node, indicated by a HIGH RLYFLT2 signal, a complete diagnostic check on all taps will be initiated. If voltage is found at the fault detection node, the static switch will immediately be closed and inverter operation terminated. This is the instant of transfer from inverter to line and is the desired condition. The transfer is always controlled to be at the voltage zero cross so that no voltage step is apparent in the output waveform.

If a low battery condition is present this last test for an open tap condition is skipped. Under such conditions it is known that there might be inadequate output voltage from the inverter to conduct the test. That is, continuity may be completed and yet voltage may not be detected. In such a case the tap combination selected is closed so that, assuming there is in fact continuity, the batteries can be charged. In any case, during the low battery condition it will not be desirable to run the inverter to do a complete open tap diagnostic check.

Output voltage is also checked to make sure adequate voltage is present to insure a valid open tap test. If the system happens to be providing surge current at the time of this test the output voltage may be depressed. Therefore, it is preferable that the test be delayed until the output voltage recovers a sufficient level to do the test.

If a complete diagnostic check on all taps is initiated, specific continuity failures can be identified. The results of a complete diagnostic check may be used to allow the system to regulate on line with the tap combinations that are still functional. This comprehensive diagnostic test for discontinuities due to relay or control circuit failures consists of independently exercising each relay in the system. The fault test timing, with considerations for relay operate time, is the same as that for the fundamental test.

Each relay in the major tap section is tested while one of the buck-boost configurations is in effect. In the case that all five of the major taps are found to be discontinuous, a different buck-boost configuration is chosen to allow for the case that a discontinuity in the buck-boost configuration is the cause for the fundamental discontinuity. An identical procedure is executed using major taps to complete continuity while testing for discontinuities in the buck-boost section. In either case, when less than the full complement of relays is found open, continuity in the complementing section is assumed for the purpose of testing the section under test, and the test is not repeated with a different major tap or buck-boost configuration. For example, if while testing the primary taps at least one tap is found which provides continuity, the test of the primary taps will be considered complete and will not be done again with a different buck-boost configuration.

Once all faults are detected and recorded, the complete diagnostics routine is repeated for verification of the errors. This is done to enhance the reliability of the UPS since battery energy may be required for regulation by a switch to extended use of inverter power if the UPS must run with tap impairment. If verification fails the entire sequence starts again by re-attempting to implement the originally requested tap combination. If verification is found a software variable which identifies faulty taps is updated to reflect the relays that were found to cause discontinuity. Additionally, a software algorithm translates the literal tap error information into a variable that indicates which of the primary and buck-boost combinations, that is, virtual taps, is available for use by the system. Therefore, the system can still provide tap regulation, conserving battery power, when the tap selection algorithm chooses those taps that are working properly. If a particular tap is not available, such that the output voltage cannot be maintained close to the nominal regulation range, the system will run on inverter until line or load conditions cause computation of a new virtual tap to be performed. In this case, it is preferable that the regulation range be opened up, by up to an additional 2% (to 5% regulation) to aid in maintaining tap regulation by increasing the probability of finding an operable virtual tap.

After a two minute delay, the tap system assumes that open relay faults have cleared and will try to regulate normally. This means that if the UPS is on inverter, it will try to transfer to line; if it is on line, it will attempt to use the previously reported open tap if it is chosen by the selection algorithm. If the faults still exist, they will be detected by the diagnostic algorithm, since it executes with every tap change.

An additional diagnostic is used to sense a shorted condition in the buck-boost circuit. A welded contact failure in this section will create continuity across the buck-boost winding when any buck-boost configuration is selected. It is preferable that diagnosis of this condition not be attempted in the fundamental diagnostic routine so that total relay operations are reduced and time on inverter during tap switching is minimized. The buck-boost switching circuit condition is preferably sensed by a software algorithm which counts the number of tap changes during an eight second period. Each second, the number of tap changes is accumulated and placed in a circular buffer so that the number of tap changes occurring in the last eight seconds is continuously updated. The contents of the buffer is summed, and if it exceeds an arbitrary number (for example, 16), a welded contact in the buck-boost winding is diagnosed. This diagnostic works on the principle that a welded contact will place in effect a different virtual tap than that which the microprocessor 100 attempts to implement, and thus the regulation target will not be met. Therefore, the tap selection procedure will select another tap. Each new tap is based on erroneous previous tap information, so stable regulation has a low probability of being met, resulting in multiple consecutive tap changes.

The remedial action taken for this condition is preferably not like that for welded contact conditions in the primary taps, which force the system to run exclusively on inverter, because regulation is still possible when tap configurations are chosen that would select the buck-boost pass-by configuration. Therefore, limited line regulation is possible. This condition is therefore treated in the same manner as an open tap condition. It is not generally desirable to attempt to diagnose specific welded contacts in the primary tap section or the by-pass relay since the act of isolating the error could cause a shorted winding.

BYPASS OPERATIONS

A further feature of the UPS 10 is the ability to bypass the static switch 18 and control circuitry. In such a bypass mode, power can continue to be applied to the output even when there has been a failure in either the static switch or the UPS control circuitry. This bypass arrangement also allows the user to carry out some maintenance operations, for example, to swap batteries while the UPS is still powering the load ("HotSwap" mode). If need be, even the logic board containing the controller 38 may be changed while the load is under power. The bypass circuit 42 is able to select from more than one of the taps 25 to allow for a degree of regulation. This allows a closer voltage window than if only a single standard tap were to be selected by the bypass circuit.

Figure 8:
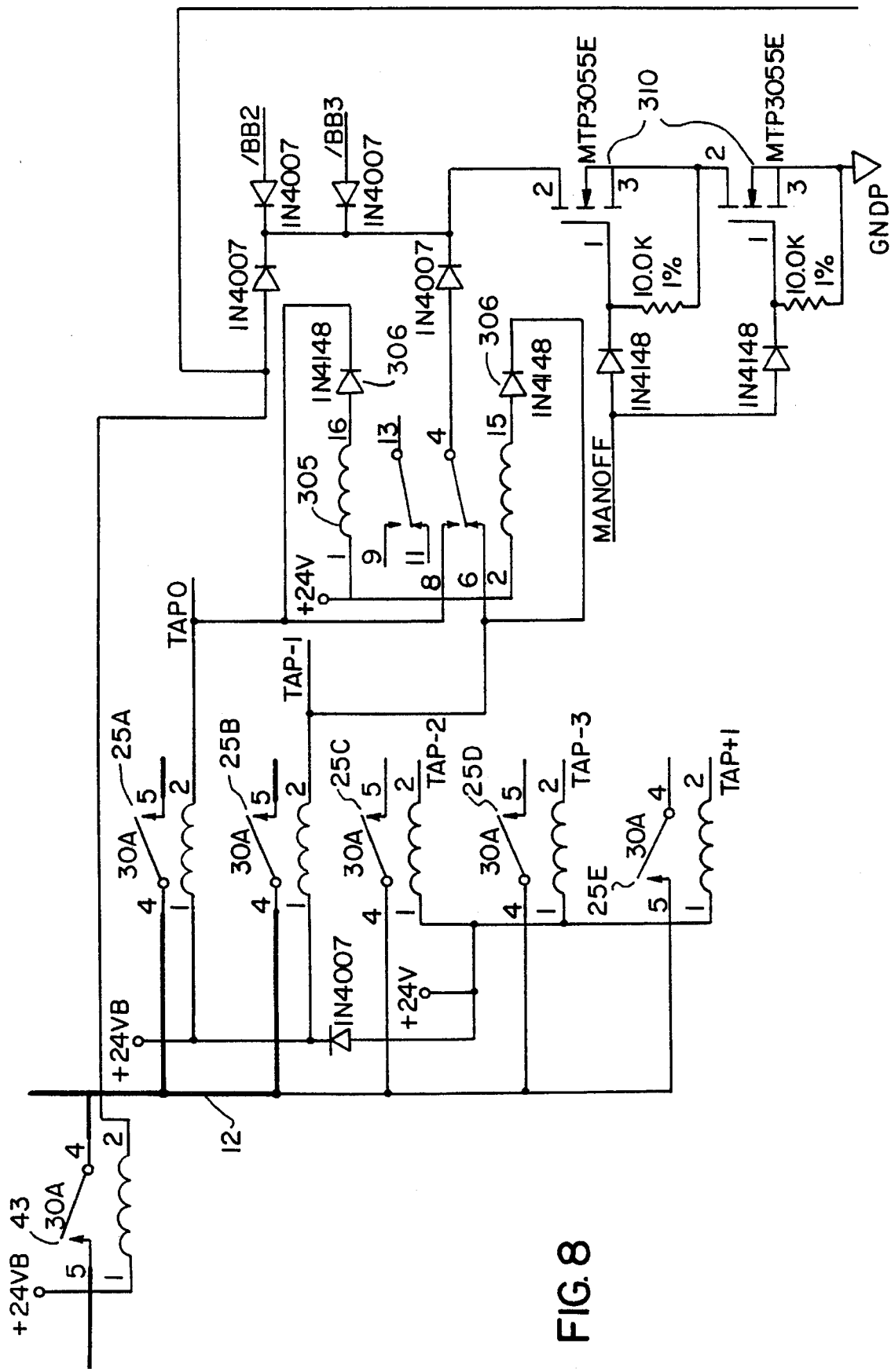
FIG. 8 is a schematic circuit diagram of the bypass tap selection circuit.

In the bypass mode, the relays 43 and 25A–25E, powered by their own line derived source, must be properly enabled to supply the main transformer so that the load remains powered and the EMI protection is still in place. The bypass circuitry is shown in FIG. 8. The relay 43 is used to bypass the static switch 18. Relays 52 and 53 in the buck-boost circuit (shown in FIG. 7A) are used to bypass the buck-boost winding. Which of the relay switches 25A–25E are to be used during bypass is determined in part by the setup of the UPS with respect to input to output voltage and on the normal power line frequency (50 Hz or 60 Hz). By way of typical example, either first relay 25A (tap 0) or second relay 25B (tap–1) may be used to complete the circuit through the primary winding. Thus, in the bypass mode, the complete circuit is from the AC input, through relay 43, through either relay 25A or 25B, through the primary transformer winding, and bypassing the buck-boost winding through relays 52 and 53.

It is preferred that there is only one condition under which the software does not select which of the 0 or –1 taps are used for bypass conditions—that is, when the microprocessor 100 is not functioning. The microprocessor will not function due to two reasons: 1) the keyswitch is in one of two positions which prevent power from being applied to the microprocessor (OFF or BYPASS); or, 2) the keyswitch is in the AUTO position, but a UPS subsystem failure causes the processor 100 not to function. The processor may malfunction due to either internal or external circuit failure. Examples of internal failures would be an execution-time fault by the processor's internal hardware (which would cause an error trap and cause the CPU to stop), or perhaps internal circuit failure due to electro-static discharge damage, for example. Examples of external failures would be a system power supply failure, or perhaps a program data bus circuit board trace loses continuity.

The microprocessor 100 selects the bypass taps for all normal operating modes, including HotSwap and Low Battery Shutdown modes. In these modes, the microprocessor chooses the bypass taps by activating the proper taps before the processor looses power due to insufficient battery voltage (extended low battery) or power supply disconnection (HotSwap mode). When the taps are activated, the latching relay position (0 or –1) is properly set by normal tap changer action.

The selection of bypass taps is based on the nominal input and output voltages. Since regulation is not possible during any bypass mode (software controlled or manual) it is preferable to provide the best statistical probability of choosing a tap that will place the output voltage as close as possible to nominal. For example, if the UPS is set up to boost a 208 volt input to a 240 volt output, it would not be desirable to use the 0 tap, since this would place 208 volts across a load that expects 240 volts. Also, in software controlled bypass modes (HotSwap and LowBattery Shutdown), the processor 100 will shut down the output voltage if it becomes too high or too low. Since voltage is not regulated during these modes, it is best to activate the nominal tap for the particular input/output voltage combination. Since the power utility is trying to maintain a nominal voltage at the input 20, this strategy provides the best chance of preventing a shutdown due to voltage deviations.

Which tap relay switch is selected for bypass mode, 25A or 25B, is determined by a latching relay 305 which serves as a one bit memory. The relay 305 is set whenever tap 0 or tap–1 is selected. Consequently, when power is applied, the last selected tap relay is the one that is energized. The diodes 306 prevent the flyback current from the relay coils from toggling the memory relay 305. This is required, as a reversed polarity on the SET coil acts the same as the proper polarity on the RESET coil. By this mechanism the output voltage is somewhat regulated even in bypass mode when the control circuitry is disabled. This is because the tap which is used in the bypass circuit will be the one most recently selected to be used by the control circuitry before bypass mode was entered into.

Figure 9:
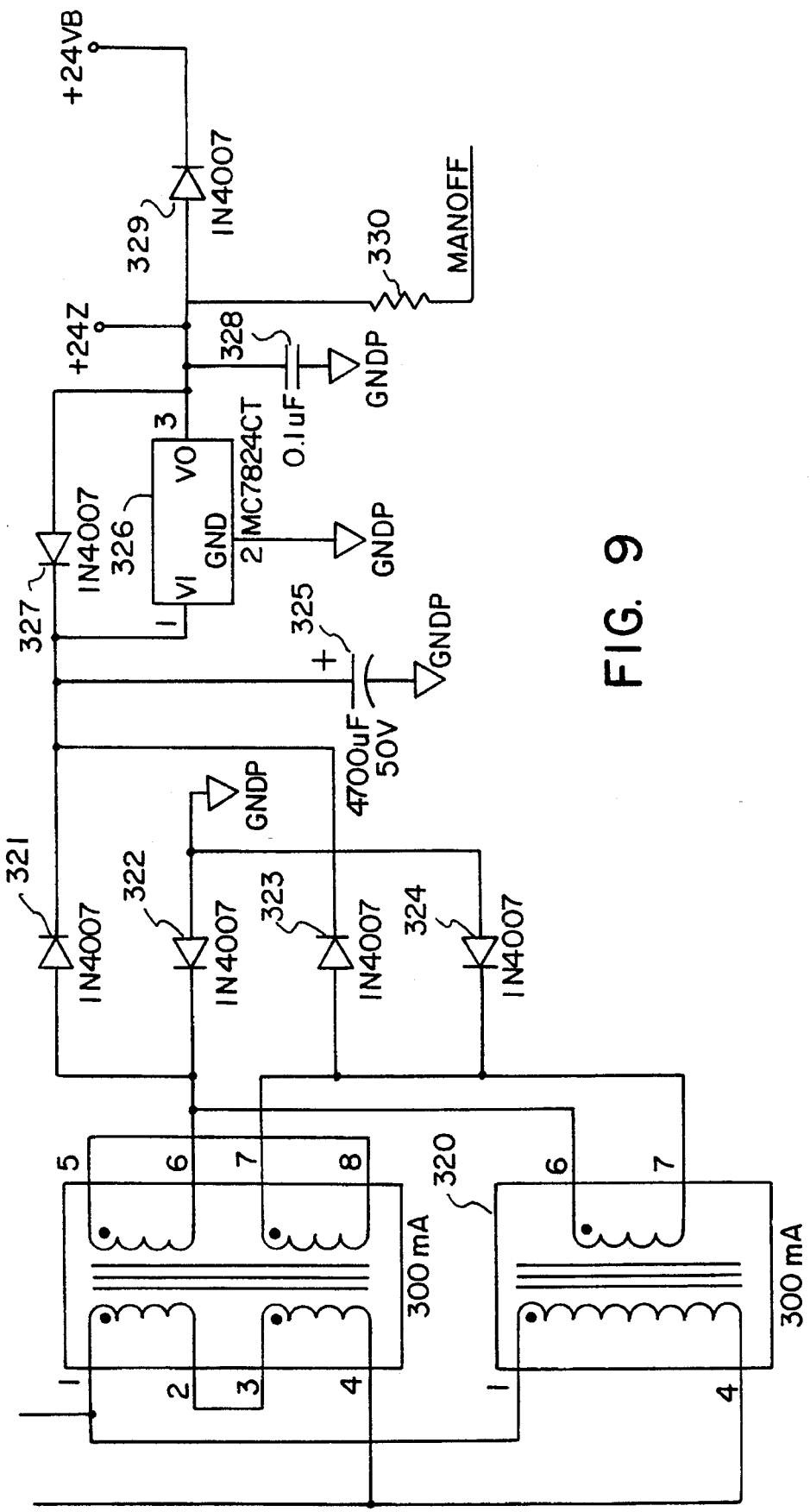
FIG. 9 is a schematic circuit diagram of the bypass circuit power supply.

The power for the bypass relays, designated +24 VB, is preferably derived directly from the line input rather than from another system power supply. An exemplary circuit for supplying such power is shown in FIG. 9. The power supply of FIG. 9 is a linearly regulated 24 volt supply, derived from a transformer 320 whose input is the AC line input. Diodes 321–324 rectify the AC output of the transformer 320, which is then filtered by a capacitor 325 and regulated to 24 volts by an integrated circuit (IC) regulator 326. A diode 327 prevents the output of the regulator 326 from going more positive than the input. A capacitor 328 stabilizes the output of the regulator. A diode 329 prevents backfeeding of the regulator. Since the bypass relays are powered by the line, the bypass mode is only available if line power is present.

As shown in FIG. 8, the bypass relays 43 and 305 are active and the UPS is in bypass mode when the transistors 310 are ON and conducting. When the transistors 310 are OFF, the UPS is in normal operation mode and operation of the bypass relays is disabled.

It is preferable that the UPS be able to enter the bypass mode in one of two ways: automatically, if the microprocessor or other control circuitry determines that there has been a failure of the static switch or control circuitry; and manually, by the operator, when he desires, for example, to swap the batteries while the unit is running.

Figure 11:
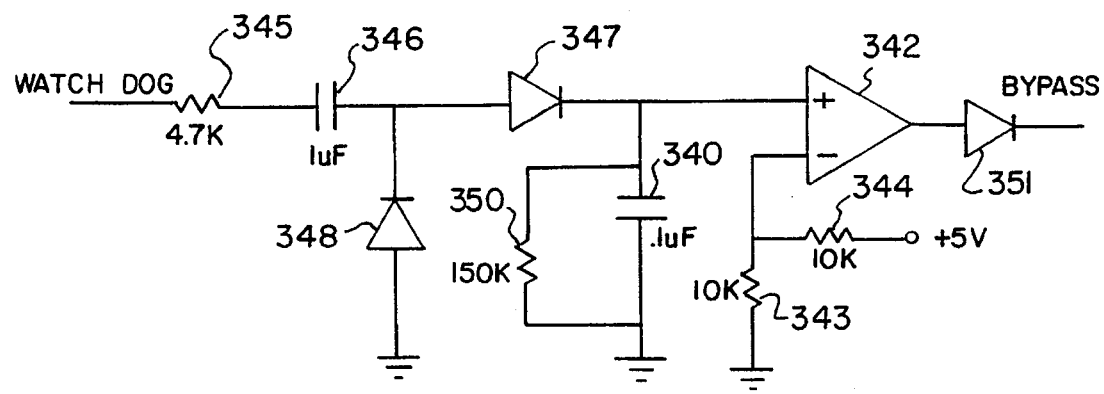
FIG. 11 is a schematic circuit diagram of the watchdog bypass circuit.

A WATCHDOG signal is generated by the microprocessor 100. This signal is a pulse occurring at 128 times the line frequency, or viewed another way, a repetitive signal with the frequency of 64 times that of line. When all is well with the microprocessor 100 and any systems which it may be monitoring, pulses are output. As shown in FIG. 11 this signal is used to charge a capacitor 340 above a certain level. This level is used to indicate the presence of a valid WATCHDOG signal. The signal is impressed on a comparator 342 and compared to a static voltage set up by resistors 343 and 344 to about 2.5 volts. The WATCHDOG pulse train is current limited by the resistor 345, is isolated by capacitor 346, and allowed only to charge the capacitor 340 through a diode 347. A diode 348 resets the capacitor 346 on the negative going edge of WATCHDOG. The time it takes to recognize a missing WATCHDOG pulse is governed by the resistor 350. A preferable setting is about 6 milliseconds, which is the time it takes to discharge the capacitor 340 from the valid WATCHDOG level to below 2.5 volts. The output of the comparator 342 is coupled through the diode 351 to the signal line BYPASS. Under normal circumstances this line is HIGH, and thus the relay drivers are enabled. The BYPASS signal is preferably also connected to a manual switch (not shown in FIG. 11) so that the signal can be brought LOW manually.

The BYPASS signal is provided to the decoding and drive circuit, as shown in FIG. 4, to indicate the state of the control circuitry. If this signal disappears, the UPS transfers automatically to bypass mode. For example, the microprocessor may be programmed so that a blown fuse or microprocessor failure would cause the loss of the BYPASS signal. Alternatively, the BYPASS signal may be manually disabled by a user. During normal operation, when the BYPASS signal is HIGH, the tap changer and buck-boost circuit decoders 200 and 205 are enabled, and the output of the driver 350, MANOFF, is LOW. When MANOFF is LOW the transistors 310, FIG. 16, are OFF and the bypass relays are disabled.

Conversely, when the BYPASS signal goes LOW (a failure signal from the microprocessor or manually selected), the tap changer decoder 200 is disabled, the address for relays 51 and 54 in the buck-boost circuit are deselected to assure they do not activate, and the MANOFF signal is pulled HIGH through the resistor 330. Thus, the MANOFF signal is now HIGH, the transistors 310 are ON, and the bypass relays are enabled.

Figure 10:
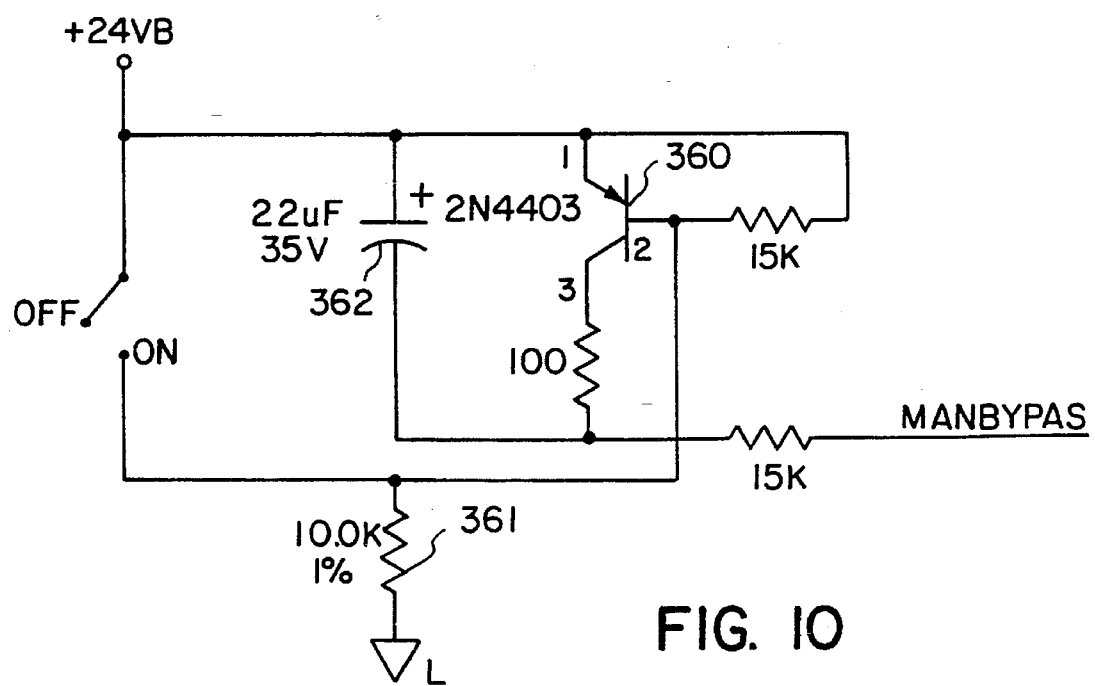
FIG. 10 is a schematic circuit diagram of the manual bypass control circuit.

The bypass relays must also be disabled when the UPS is turned off. This is required so that there is no power flowing to the UPS output when the system is OFF. The circuit of FIG. 10 assures that when the UPS is turned on the bypass mode is not entered into unintentionally while the microprocessor is in the process of generating the WATCHDOG signal. When the UPS is turned OFF, the base of a transistor 360 is pulled to ground through a resistor 361, turning the transistor ON. This guarantees that a MANBYPAS signal is HIGH. A HIGH MANBYPAS signal turns on a driver 351 (FIG. 4) causing the MANOFF signal to go LOW, holding the transistors 310 OFF so that the bypass relays cannot be energized. When the UPS is turned ON the base of the transistor 360 is shorted out, turning the transistor OFF. MANBYPAS is still held HIGH by virtue of the capacitor 362, which begins charging. After about 0.5 seconds, the capacitor 362 is sufficiently charged so that the current into the driver 351 is insufficient to keep it turned on. The driver 351 thereby releases its hold on the transistors 310, allowing the MANOFF signal to be controlled by the BYPASS signal and permitting bypass operation. Under ordinary conditions, the watchdog signal will occur after a few hundred milliseconds and will be holding the bypass gates 310 OFF through MANOFF via the BYPASS signal.

LINE FAULT DETECTION

As has already been described, it is preferable that line fault detection for the UPS be accomplished independently from the voltage regulation scheme described. A preferred line fault detection system is described in U.S. Pat. Nos. 5,229,651 and U.S. Pat. No. 5,315,533, the disclosures of which are incorporated by reference. These two patents describe and make use of an adaptive line reference line fault detection to systematic disturbances occurring on the line which could otherwise cause unnecessary transfers to battery power. Under this system a reference waveform is constructed of a moving average of the current and previous line signals. The reference is thereby adapted to systematic line disturbances. For rapid line fault detection the reference waveform is compared to the line voltage waveform using comparators to detect non-systematic deviations in the instantaneous line. In making this comparison an allowable tolerance between the reference and line voltage (a "line delta") is employed. This line delta can be fixed at several levels representing different states of the UPS. For example, a low delta may be used for normal line operation, and a high delta for transfers from inverter back to line.

It is preferable, however, that the line delta may not only be fixed by the user but also may be continuously adjustable so as to continuously adjust line fault sensitivity to find the best compromise between minimizing battery usage by refraining to switch to battery power and by switching to battery power when the input waveform becomes undesirably distorted. As the line delta widens, inverter activity and battery usage will be reduced, but the quality of line interactive transfers will be diminished. An adaptive delta allows the system to run with degraded line conditions without excessively depleting battery energy. This adaptability reduces the special attention required to make a UPS usable under a wide variety of power environments.

The adaptive delta technique involves adjusting the delta based on the number of line fault occurrences occurring in a specific interval. If the number of line fault occurrences in a specific interval exceeds a certain amount, indicating a highly distorted or noisy power source, the line delta will be increased. This makes the system less sensitive to non-systematic line disturbances. If, on the other hand, no line faults occur in a specific interval, indicating a stable input power source, the line delta is decreased. This restores sensitivity to non-systematic line disturbances.

Figure 12:
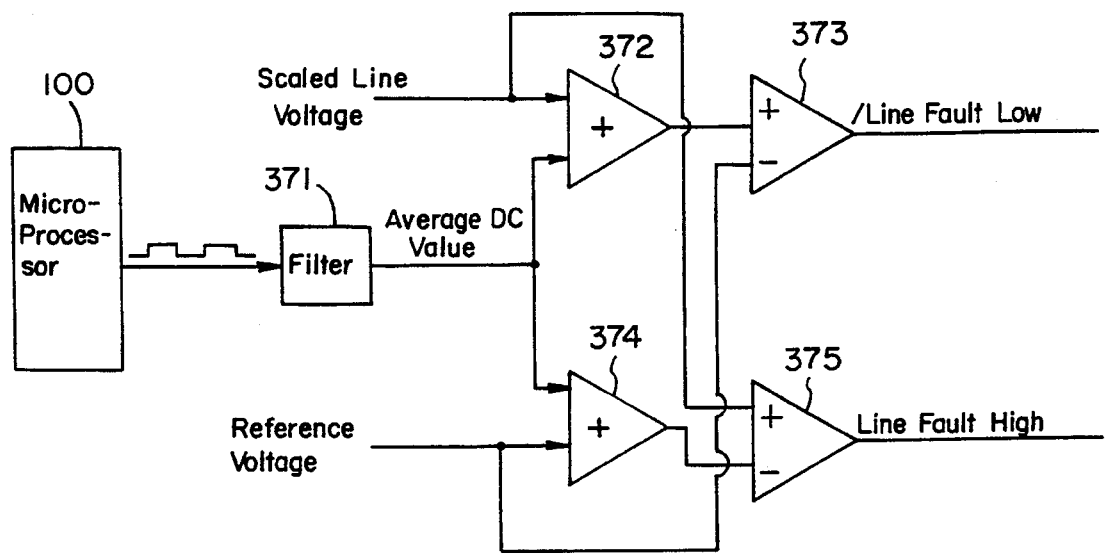
FIG. 12 is a schematic circuit diagram showing the line fault detection circuit.

The preferred embodiment of the adaptive line delta invention, as shown in FIG. 12, involves generating a signal representative of the line delta in a microprocessor, converting this signal to a DC voltage level, and adding this voltage level to the line voltage waveform for comparison with a reference voltage waveform for determining the presence of an instantaneous line fault. For example, a microprocessor 100 preferably produces a 19.2 kHz modulated square wave whose duty cycle is proportional to the waveform's average value. This average value, in turn, is representative of the line delta. The duty cycle has a granularity equal to one counter tick out of a total range of 130 counter ticks per cycle. Each counter tick is 400 nanoseconds in duration. If the number of line fault occurrences in a one-quarter second interval exceed a specific number allowed, the duty cycle is increased by 1/130 of its range, that is, an additional counter tick. This increases the adaptive delta value. If, on the other hand, no line fault occurs in a specific number of one-quarter second intervals the duty cycle is decreased by 1/130 of its range. This reduces the adaptive line delta value.

This square wave representing the line delta is fed to a single pole low pass filter 371 which extracts the DC component, that is the signal's average value, from the signal. This average value is fed to a buffer amplifier 372 which inserts the value into the line versus reference voltage waveform comparator circuit by summing the average value, representing line delta, with the scaled line voltage waveform which are compared in a comparator 373 whose output indicates the presence of a line fault when the line voltage plus delta falls below the reference voltage. This action causes a voltage separation between the scaled line voltage waveform and the adaptive reference waveform. The degree of voltage separation is proportional to the sensitivity of the circuit to line disturbances.

Since a UPS should switch to battery power when the input voltage level becomes too high, as well too low, it is preferable that the adaptive line delta also be employed in the detection of such faults. In such a case the same line delta value may be used. In this case, however, a separate comparator circuit is employed and the adaptive line delta value is added to the reference voltage waveform 374 before comparison with the line voltage waveform 375. In this way, instantaneous excursions from nominal line voltage will be indicated provided that the excursion exceeds the line delta at the time of occurrence.

It is preferable that the adaptive line delta be capable of being overridden so that users who wish to adjust line fault sensitivity to a constant value may fix the line delta. In addition, it should be noted that the degree of adaptation of the line delta is an interpretation of line quality. Therefore, the adaptive line delta calculations can be used to form a line quality index which can be reported to the user and to service personnel via the user display 41 for diagnostic purposes.

ZERO CROSS DETECTION

UPS systems rely on an accurate determination of line voltage zero crosses for a variety of purposes. Principal among these is system synchronization and line frequency determination. In a UPS in accordance with the present invention, for example, as has been shown, an accurate determination of the zero cross is required for proper timing of the tap changing diagnostic system which operates at this line frequency interval. Conventional zero cross discrimination is based on selecting the frequency response of a filter network so that it will reject components which represent noise signals, thereby discriminating the true zero cross from those which are caused by waveform distortion and noise. Noise signals generally consist of harmonics of the fundamental, and random glitches that can cause false zero cross indications of line frequency. Filters that possess the correct phase and magnitude response are difficult to synthesize because the frequency components that must be eliminated are typically very close to those which must be passed. Specifically, second order harmonics associated with engine generator sources and industrial environments must be rejected, and it is difficult to attenuate these sufficiently and economically with frequency spectrum filtering.

In accordance with the present invention a geometric zero cross discriminator is provided. This discriminator approaches the harmonic frequency rejection problem from a perspective which considers the geometry of a noise waveform. Noise geometry, with respect to this discriminator, is defined as the time duration of one cycle of periodic noise or the simple time duration of random noise. The geometric discriminator rejects events that exhibit periods (geometries) inconsistent with fundamental line frequency. This is accomplished by storing the composite line signal geometry information in a time delay network, and by processing this information so that it cancels its own geometric properties. A cancellation only occurs when the information exhibits a duration less than ½ of the time delay. Thus, signals that have a geometry greater than ½ the time delay pass through the discriminator and are interpreted as legitimate fundamental frequency information.

Figure 13A:
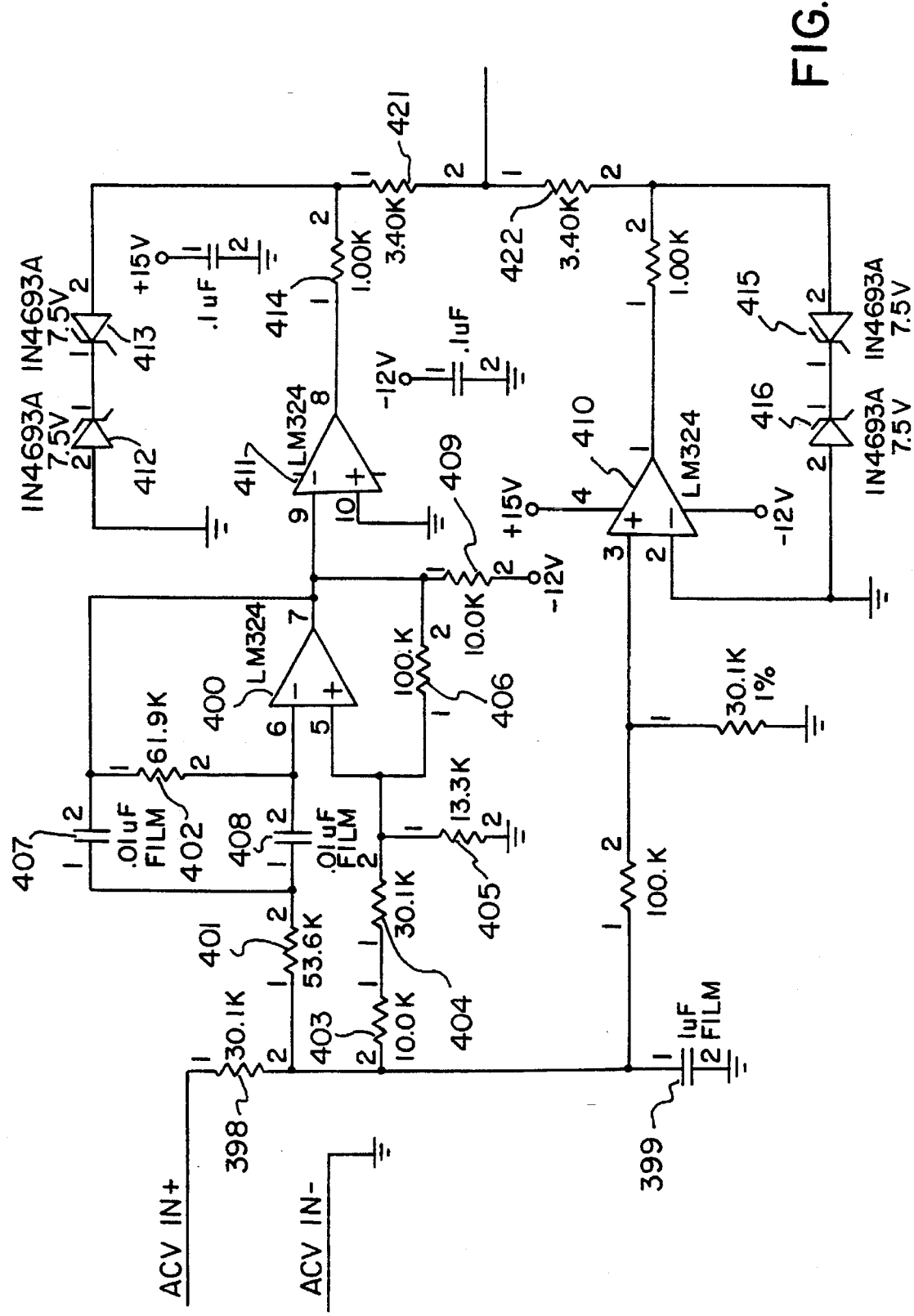
FIG. 13 is a schematic circuit diagram of the zero cross detection circuit.
Figure 13B:
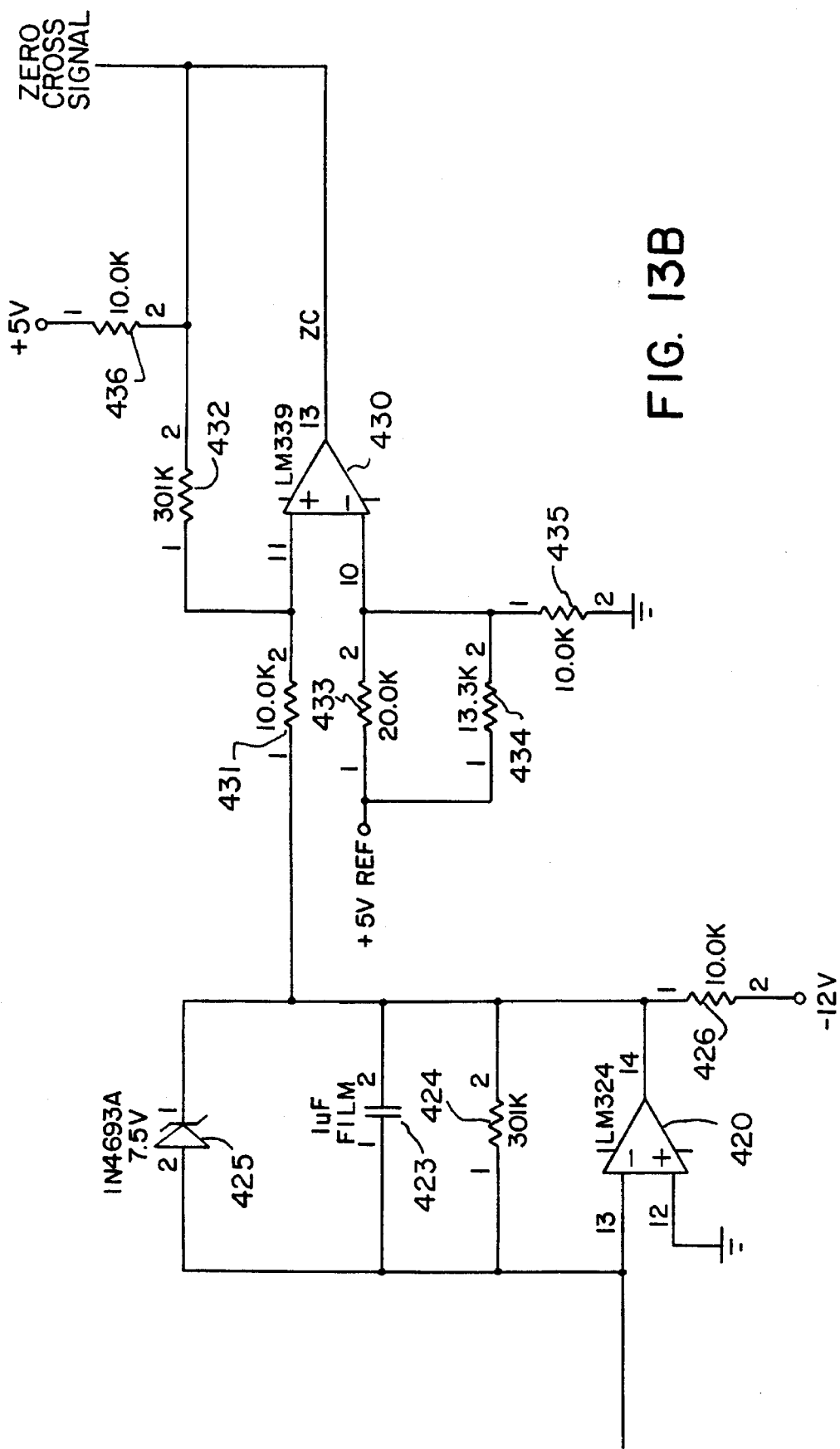

The operation of the geometric zero cross discriminator is illustrated with reference to FIG. 13. The discriminator circuit contains a time delay network. The purpose of the time delay is to allow the line voltage input signal to be processed twice, once in real time and once in delayed time. It is the delayed processing that cancels signals which exhibit noise geometric properties. Signals with noise geometric properties are those that have a duration, or period, of less than one half of the time delay network. Resistor 398 and capacitor 399 have the primary function of scaling the input voltage from the input transformer to a reasonable level for the discriminator circuits. This filter is used instead of a resistive voltage divider because it provides additional attenuation of noise. Scaled AC line voltage is fed to the circuitry associated with operational amplifier 400. This amplifier 400, along with resistors 401–406 and capacitors 407 and 408, form an all pass constant time delay filter. A preferable time delay for this filter is 2 milliseconds for frequencies up to 1 kHz. Resistor 409 eliminates cross-over distortion inherent in the amplifier.

Following the time delay network are two squaring circuits. One squaring circuit will see the line voltage signal in real time, the other squaring circuit will see the line voltage in delayed time, preferably 2 milliseconds later. The squaring circuits perform two functions: the first function is to square up the real time and delayed time input signals; the second function is to invert the delayed signal, that is, change its algebraic sign. A continuous time signal is not desired, but rather a simple zero cross indication which contains polarity information. Squaring of the input signals provides such information and improves the precision of detecting the noise geometry of the signals. This is helpful because the all pass filter is not ideal and will slightly modify the delayed signal waveform and thus modify its noise geometry. Since the processing that occurs in the block following the squaring circuits is a summing technique to cancel the noise signals, inverting the delayed time signal after squaring it gives it the correct algebraic sign so that the cancellation can be performed.

The squaring circuits, one for real time processing and one for delayed time processing are represented by operational amplifiers 410 and 411, respectively. The amplifiers are connected as comparators. The output of the inverting comparator 411 is constrained to +/− 8.2 volts by diodes 412, 413 and resistor 414. The resistor 414 also provides current limiting. The non-inverting comparator 410 works similarly. These signals are limited at equal magnitudes so that the summing integrator, which follows the comparators, will exhibit a constant output voltage when the comparators outputs, at the anodes of the zener diodes 413 and 415, are of opposite algebraic signs.

The summing integrator processes the real time and delayed time geometries of the line voltage signal after the signal conditioning occurs at the previously described blocks. Processing amounts to summing of the inverted and non-inverted signals and simultaneously integrating this summation. The integrator is implemented with an operational amplifier 420. When the squaring circuits' outputs are of opposite algebraic sign, the summing integrator's output does not change; when the squaring circuits' outputs are of the same algebraic sign, the integrator's output begins to make a voltage transition which is dependent on the constant magnitude of its summed input signal and the gain of the integrator. The input signal amplitude is set by the zener clamps 412, 413 and 415, 416 of the squaring circuit. The gain of the integrator is set by resistors 421 and 422 and capacitor 423. The resistor 424 provides a path for bias voltages that would otherwise cause the integrator to saturate. A diode 425 limits the output of integrator 420 to the range of −0.7 to +7.5 volts. The preceding parameters have been set such that the time of the transition from −0.7 to +7.5 volts is equal to the time delay of the all pass filter. A resistor 426 eliminates cross-over distortion associated with the integrator 420.

An example of how the geometry of the input signal is processed, and how cancellation of noise occurs, follows. Assume initial conditions are such that the output of the inverting squaring circuit represented by comparator 411 is at −8.2 volts, the non-inverting squarer 410 output is at +8.2 volts, and the integrator 420 output is at −0.7 volts. Assume a random negative going glitch that has a duration of 250 microseconds. The glitch is fed through the squaring circuit of comparator 410 in real time which causes its output to go to −8.2 volts. Because the inputs to the summing integrator 420 no longer cancel each other, the integrator output begins its transition towards +7.5 volts at a constant rate determined by its input voltages and the gain of integrator. When the glitch terminates 250 microseconds later, the output of comparator 410 returns to +8.2 volts and the transition of the integrator 420 stops, holding at an intermediate voltage between −0.7 and +7.5 volts. Two milliseconds later, when the same glitch passes through the all-pass time delayed filter, it is processed similarly by the inverting squaring circuit and the integrator 420. The result of the second processing is to return the integrator output voltage back to −0.7 volts, thereby completely rejecting any effect the geometry of the glitch would have against the geometry of the line frequency signal. The processing just described has the property of superposition with the legitimate line signal. Line frequency geometry is passed by the circuit because the half period of the line cycle exceeds ½ the time delay of the all pass filter; therefore, the integrator output will exceed ½ of the transition voltage magnitude between −0.7 and +7.5 volts, which will cause a zero cross indication.

Following the summing integrator is a unipolar squaring circuit which provides a fast transition logic signal to the microprocessor 100 line frequency detection pin. This is required because the rate of change of the output voltage of the integrator 420 is too slow to feed directly to the microprocessor 100 logic inputs. The circuitry associated with the comparator 430 provides a fast 0 to +5 volt logic signal that depicts the transition of the output integrator when it passes the comparator trip voltage which indicates a zero cross. This signal is fed to the microprocessor 100 which detects the transition and recognizes a true zero cross indication. This signal may be used, for example, to trigger an interrupt driven phase locked loop zero cross procedure, e.g., as shown in U.S. patent application Ser. No. 08/161,338, incorporated by reference. The resistor 431 isolates the non-inverting input to the comparator 430 so that resistor 432 can introduce hysteresis there, suppressing oscillations. The reference trip point is established by the voltage divider consisting of resistors 433–435 fed by a precision 5 volt reference. (Resistor 433 and 434 may be replaced by a single resistor.) Resistor 436 is a pull-up resistor which in conjunction with resistors 431 and 432, establishes a minimum logic high voltage level well above the guaranteed input logic high of the microprocessor input 100, which is 1.9 volts.

Whether the true zero cross occurred or not is not known until after both the real time and time delayed processing occurs. This causes the zero cross signal to exhibit a constant time lag. The time lag is irrelevant as far as the determination of line frequency is concerned because it is the period measurement which is used to determine line frequency. The period is measured from zero cross to zero cross, so the time lag has no effect on frequency detection. As far as phase is concerned it is preferable that a system phase locked loop lock with a phase displacement equal to the time lag of the all pass filter and any network proceeding it. This 2 millisecond displacement, plus any displacement due to preceding networks, is coarsely compensated in the microprocessor. This may be done, for example, by shifting the sample indices of the inverter sine reference table (which is synchronized via the phase locked loop) by a number of sample indices equivalent to the average phase delay imposed by the zero cross discriminator. Regarding the reference voltage waveform, the same correction occurs, however, the action of the moving average applied to the adaptive line reference creates a line fault reference which is independent of any phase delay of the zero cross discriminator, and so the correction is not essential for the adaptive line fault reference.

This discriminator is designed largely to discriminate against multiple zero crosses created by the presence of low order harmonics in the line voltage waveform. The period of these harmonics does not exceed the geometric stop band of the discriminator, and thus it would seem that the discriminator should pass these harmonic disturbances. However, it is the period of the zero cross disturbance resulting from the superposition of harmonics with the line frequency fundamental that falls within the stop band of the discriminator. Consequently, while consideration of the harmonic period is in line with the spectro-filtering approach, consideration of the composite period (or disturbance period) of the superposition of such signals with the fundamental components represents the geometric filtering approach, and the bandwidth (time delay) of the discriminator can thus be established.

BATTERY CHARGER

Figure 14A:
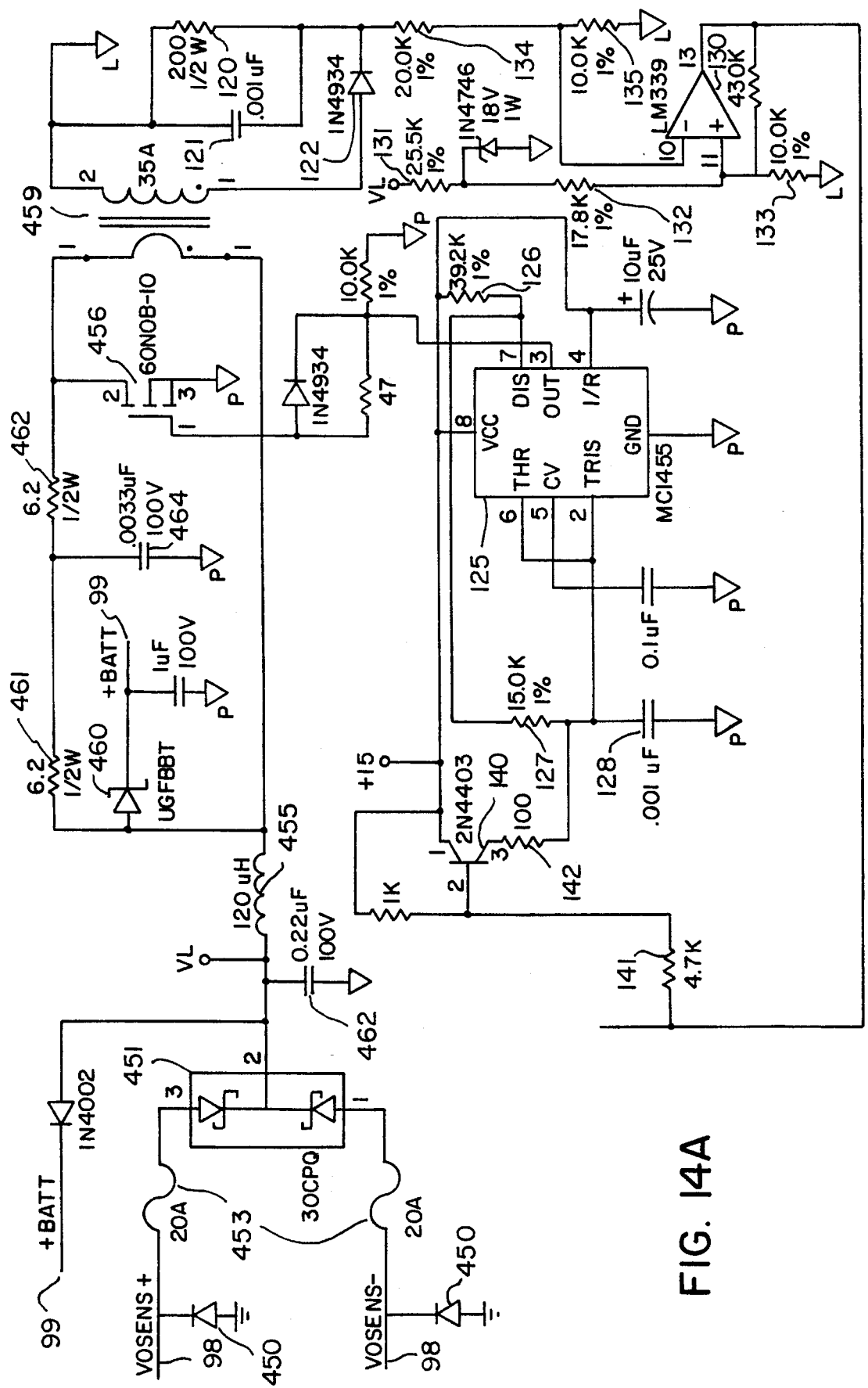
FIG. 14 is a schematic circuit diagram of the battery charger circuit.
Figure 14B:
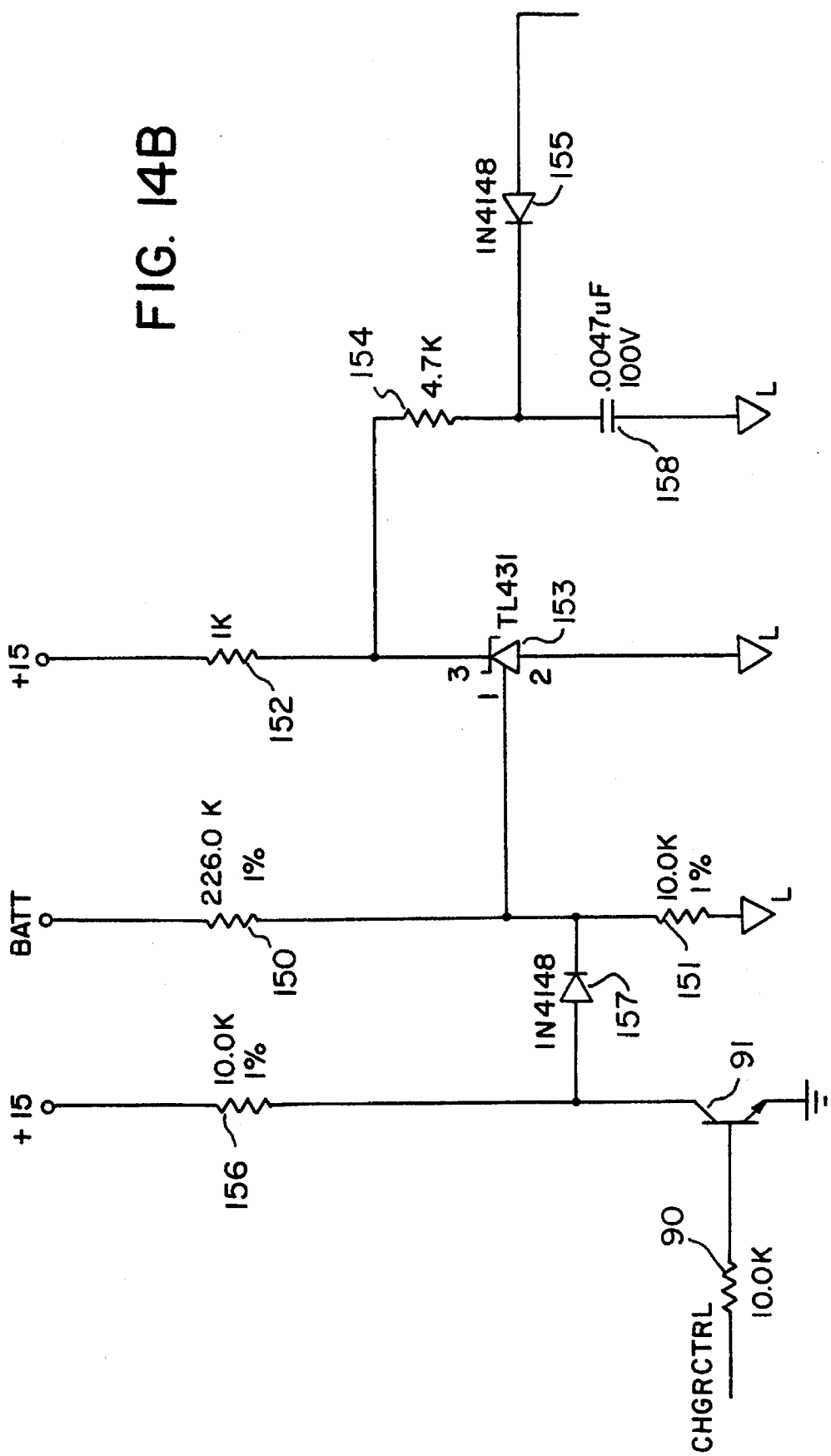

The features and operation of the battery charger are illustrated with reference to FIG. 14. This is a power factor corrected charger designed to deliver, e.g., 4 amps up to a battery voltage of, e.g., 57 volts. The charger features a constant power output. Consequently, the charge current decreases proportionately as the battery voltage increases. The battery charger receives a relatively steady AC voltage, e.g., 25 volts rms, at the charger input lines 98 from the inverter winding 33 of the UPS acting as an auxiliary secondary during AC line operation. The input voltage at the winding 33 is stepped down by the UPS transformer 28 from AC power line voltage and is maintained substantially constant by the UPS by the switching of the tap changer 26 and the buck-boost circuit 30 in the manner described above.

The AC input to the battery charger from the winding 33 on the lines 98 is rectified by a bridge rectifier which is comprised of two pairs 450 and 451 of diodes. In this particular embodiment the two diodes 450 are preferably comprised of the body diodes of the bottom MOSFETs within the H-bridge inverter 34. The output voltage of this bridge, VL, becomes the unfiltered DC input for the charger. A capacitor 452 is connected between the output and circuit ground only for EMI suppression and does not affect the desired DC output waveform. The rectifier also contains two input fuses 453 which are rated at 20 amps each.

The charger functions as a boost converter. The DC input voltage, VL, is less than the battery voltage, VBATT. Energy is transferred from the DC input into a charger inductor 455 during the time that a transistor 456 (e.g., a power MOSFET) is ON. During this ON time current increases in the inductor 455 as it flows from the DC input through the primary of a current sensing transformer 459 and the transistor 456 to power ground. When the transistor 456 is OFF, the inductor 455 transfers its energy into the battery 32 on a line 99 through a diode 460. Current in the coil 455 is continuous (always flowing either through the transistor 456 or to the battery 32) during charger operation. Resistors 461 and 462 and a capacitor 464 form a snubber for the transistor 456 and the diode 460 to eliminate excessive voltage spikes across the transistor.

An integrated circuit timer 125 (e.g., MC1455) is used to control charging at a cycle frequency at or above a selected minimum frequency. The minimum frequency operation is selected to keep the charger operation from becoming audible. It also allows the transformer 459 to be pulsed so that a proper signal is developed across a resistor 120 connected to the secondary of the transformer 459, which is used to control the current in the coil 455. The minimum frequency is preferably set at approximately 20 kHz by resistors 126 and 127 and a capacitor 128. The maximum ON time, determined by the resistor 126 in series with resistor 127 charging the capacitor 128 to the upper threshold voltage on pins 2 and 5 of the timer 125, is approximately 38 microseconds. Once this threshold has been reached, pin 7 on the timer goes LOW. Now capacitor 128 discharges through the resistor 127 to the lower threshold voltage of the timer, at which point pin 7 goes HIGH. This discharge time determines the OFF time, e.g., approximately 10 microseconds. During the ON time pin 3 of the timer 125 goes HIGH, which turns the transistor 456 ON, thereby charging the inductor 455. Pin 3 of the timer 125 goes LOW during the OFF time which turns the transistor 105 OFF.

Additional circuitry is used to control the maximum current and voltage output of the charger. Current mode operation is controlled by a comparator 130 by regulating the duty cycle of the ON time. The current through the inductor 455 is monitored by the transformer 459 during the time that the transistor 456 is ON. The output of the transformer 459 is developed across a burden resistor 120 through a diode 122. The scaling is 1 volt=1 amp. This signal is used to control the current in the coil. A capacitor 121 filters the signal across the resistor 120. The voltage seen across the resistor 120, representing the current in the inductor 455, is scaled through a voltage divider composed of resistors 134 and 135 to the inverting input of the comparator 130.

The unregulated DC signal seen at the VL input of the charger is scaled and provided to the non-inverting input of the comparator 130 through a voltage divider composed of resistors 131, 132, and 133. This signal is representative of the line voltage powering the charger and is used as the reference for controlling the current in the inductor 455. The signal at the inverting input of the comparator 130 increases as the current in the inductor 455 rises. As this voltage reaches the line reference voltage on the non-inverting input of the comparator 130, the output of the comparator goes low, which turns a transistor 140 ON through a resistor 141. When the transistor 140 is ON the capacitor 128 is charged through the resistor 142 past the upper threshold of pins 2 and 5 of the timer 125. This terminates the ON pulse, turning the transistor 456 OFF. When the transistor 456 is OFF the voltage across the resistor 120 drops to 0 volts, allowing the inverting input of the comparator 130 to drop below the reference voltage on the non-inverting input. This, in turn, allows the output of the comparator to return to a high impedance state. The transistor 140 then turns OFF and allows the capacitor 128 to discharge to the lower voltage threshold of the timer 125. When this lower threshold is reached, pin 3 of the timer 125 goes HIGH turning the transistor 456 ON once again and starting the cycle over. As can be seen, the OFF time of the charger cycle remains constant with the time set by the discharge of the capacitor 128 through the resistor 127. The ON time,. however, varies due to the amount of current in the inductor 455 activating the comparator 130, with the maximum ON time determined by capacitor 128 charging through resistors 126 and 127. Because the OFF time is constant, the ripple current in the inductor 455 is determined by the inductance value. Since the ON time is variable the frequency of the charger varies, which helps reduce EMI emissions.

Because the inductor current is compared to a signal representing the line voltage, the current in the inductor follows the line voltage, thereby presenting a unity power factor to the AC power lines. Because the input voltage to the inverter is regulated by the top changer 26 and buck-boost circuit 34, the input to the inductor 455 and the reference for the current is regulated, and the energy stored in the inductor 455 is controlled regardless of battery voltage. Consequently, the output power of the battery charger is substantially constant. The charge current decreases proportionately as the battery voltage increases.

Over-voltage protection is provided to monitor the battery voltage in case a failure occurs or the battery voltage is miscalibrated. The over voltage protection circuitry consists of resistors 150, 151, and 152, and a programmable reference device 153. A voltage divider composed of resistors 150 and 151 monitors the battery voltage. The voltage at the gate input to the device 153 is compared to an internal voltage of 2.5 volts. As the voltage on the input reaches 2.5 volts (at VBATT=59 volts) the device 153 is turned on and pulled towards ground. This turns ON the transistor 140 through a resistor 154, a diode 155, and the resistor 141. The current through transistor 140 charges the capacitor 128 faster, which decreases the ON time. At the same time, the discharge is slowed, thereby lengthening the OFF time. If the transistor 140 is turned on hard, the capacitor 128 is not allowed to discharge at all, holding the charger OFF.

Voltage control of the charger is based on the calibrated battery voltage, and is controlled by the microprocessor 100. This control is effected through a 20 kHz signal, CHGRC-TRL, which is buffered by resistor 90 controlling the base of transistor 91. The CHGRCTRL signal pulls a resistor 156 to ground when ON. When the resistor 156 is held LOW, the voltage on the input of the device 153 is normally below 2.5 volts and the charger will operate in the current controlled mode. The charger is held OFF, however, when the resistor 156 is allowed to supply current to the input of the device 153 through the diode 157. This raises the voltage at the input of the device 153 above 2.5 volts. The device 153 thus turns the transistor 140 ON which holds the timer 125 in the OFF mode. This ON/OFF signal is toggled at 20 kHz. The charger starts to operate at a fixed 20 kHz rate with the OFF signal terminating the ON pulse every 50 microseconds during this mode of operation. By varying the duty cycle of this signal, the charger current is controlled, thereby controlling the float voltage of the batteries. The granularity of this signal is 130 ticks per cycle, resulting in a voltage control deadband of 0.15 V. The microprocessor signal contains a minimum OFF time of 1 microsecond at the 20 kHz rate during all modes of charger operation. The resistor 154 and the capacitor 158 filter the 1 microsecond pulse signal so that the current mode of operation is not affected.

By utilizing microprocessor control of the battery charger, the natural aging and degradation of batteries due to conventional charging techniques can be mitigated. This is because the battery charger can be completely programmable and the charging profile can be modified to be as effective as possible. The charger of the present invention preferably has four charging modes implemented in the microprocessor. The modes can be programmed according to time and voltage constraints in order to accommodate a wide variety of charging profiles. The programming is effected by altering parameters associated with each mode.

The low battery voltage level of the UPS may be determined dynamically by an equation which compensates for a battery's internal dynamic resistance: this resistance will cause a lower terminal voltage on the battery when the discharge rate of the battery is high. The following provides a description of the functions of the two terms in the setpoint equation, how the real-time instantaneous results of the equation are averaged so as to prevent an inappropriate shutdown due to load changes, and an explanation of the pre-scaling applied to the parameters, Vllo and Kll.

The following equation governs the value of the Low Battery Setpoint parameter:

$$\text{LowBatterySetpoint} = \text{Vllo} - \text{Kll} * \left[ \frac{P_o}{C} \right]^{1/2} \text{ volts/cell} \qquad (7)$$

where:

Vllo is the battery manufacturer's recommended low battery set point under a no load condition;

Kll is a scaling factor dependent on a battery manufacturer's parameters (the default value should not require modification unless batteries with very unusual characteristics are used);

$P_o$ is the instantaneous output power of the UPS which may be calculated in real time using calibrated samples of output voltage and output current.

Vllo is a constant which represents the low battery setpoint for open circuit conditions. The second term, comprised of Kll and a factor that implements power and battery capacity parameters, serves to modify the low battery setpoint proportionally to the square root of the ration of load power to the UPSs total battery capacity. As power increases for a given battery capacity, the setpoint will be lowered from the open circuit value of Vllo. Therefore, it can be seen that the second term represents a correction for the battery string's dynamic resistance.

Typical default values for Vllo and Kll are 1.75 and 0.0156, respectively. Equation 7 with these values substituted is:

$$\text{LowBatterySetpoint} = 1.75 - 0.0156 * \left[ \frac{P_o}{C} \right]^{1/2} \text{ volts/cell} \qquad (8)$$

Where integer mathematics is used, Vllo and Kll must be scaled to integer values in order to maintain accuracy. Furthermore, to compute a setpoint for the entire string, Vllo and Kll must be multiplied by the number of series cells (equivalent cells) in the string(s), which is 24 for any number of paralleled 48 volt strings. Vllo is scaled as follows:

$$\text{Parameter Vllo} = \text{Vllo} \frac{\text{volts}}{\text{cell}} * 100 * 24 \frac{\text{cells}}{\text{string}} \qquad (9)$$

With a value of Vllo of 1.75, the pre-scaled decimal number representing Vllo is:

$$4200 \frac{\text{volts} * 10^2}{\text{string}} \qquad (10)$$

Kll is scaled as follows:

$$\text{ParameterKll} = \text{Kll} \frac{(\text{volts} * \text{hours})^{1/2}}{\text{cell}} * 10000 * 24 \frac{\text{cells}}{\text{string}} \qquad (11)$$

With a value of Kll of 0.0156, the pre-scaled decimal number representing Kll is:

$$3744 \frac{(\text{volts} * \text{hours})^{1/2} * 10^4}{\text{string}} \qquad (12)$$

Note that the units of the setpoint equation have been modified by the scaling and are now expressed in units of scaled volts per string. The setpoint algorithm will make consistent the units of the setpoint with that of battery string voltage so that a direct comparison of the two quantities can be made.

If the load changes abruptly from light load to heavy load, the setpoint is allowed to change quickly (according to the change in power level) to keep the LowBatterySetpoint below the battery voltage (which rapidly decreases in response to the heavy load); however, if the load changes abruptly from heavy load to light load, the setpoint equation will see the power change and compute a setpoint which is likely to be higher than the instantaneous battery voltage. This would cause the system to inappropriately shut down. Therefore, a moving average is applied to the LowBatterySetpoint computation, but only when the power level diminishes. This causes the setpoint to rise slowly, appropriately remaining below the actual battery voltage as battery voltage in response to the lighter load.

The effects of the moving average require a couple of seconds to dissipate, that is, the transient response of the moving average is completed within a couple of seconds, leaving the LowBatterySetpoint to reflect its steady state value for a given steady state power level.

For each charging mode the duty cycle of the battery charger control signal, CHGRCTRL, is adjusted by the microprocessor so that the desired battery charging voltage is achieved. The battery voltage is monitored and calibrated by the microprocessor 100 in a conventional manner.

The battery charger generally operates whenever the system is operating on line power. When the charger is operating it must be in one of four modes, maintenance mode, constant power mode, constant voltage mode, or periodic mode. Maintenance mode is entered into when the batteries have been fully charged. In this mode battery voltage is maintained at a programmable maintenance voltage level preferably below that of normal charging voltage. The typical voltage level may be approximately 52 volts for a normal charged voltage level of 57 volts. The intent of this mode is to provide enough charge current to provide the energy for the system DC power supplies and compensate for the self discharge of the batteries. In maintenance mode no current is drawn from the batteries for the low level DC power supplies. Maintenance mode has no time constraint associated with it. If, in order to maintain the voltage level desired, the CHGRCTRL signal is forced to extend to its maximum duty cycle, maintenance mode will be terminated and constant power mode will be entered.

Any long term inverter activity will cause the charger to enter constant power mode. The purpose of the constant power mode is to bring the batteries to the programmable float, or normal, charge voltage. A typical voltage level is approximately 57 volts. This mode makes use of a programmable time duration which defines a decision point. If the batteries are brought to the float voltage within the programmable time duration the batteries are assumed to be at full capacity and the charger will revert to maintenance mode. If the batteries take longer than the programmable time duration to reach full capacity the charger will change to a constant voltage mode once the batteries are finally brought to the normal charge level. A typical time duration for the decision will be about 4 minutes.

It should be noted that if an auxiliary charger is connected to the system it should be activated by the constant power mode only. It should also be noted that if the time required to bring the battery to the normal charge voltage is longer than the battery amp-hour capacity divided by the charger ampere rating, a check battery alarm should be indicated.

It is preferable that the battery temperature also be monitored by the microprocessor 100, e.g., by use of thermistor 470 as illustrated in FIG. 1. If the battery temperature falls below a programmable temperature (typically 10° C.) the target float voltage could then be changed to a more preferable (i.e. higher) value indicated by a programmable parameter. In any case, it should be noted that the maintenance mode voltage should not vary with temperature.

If the batteries remain in the constant power mode for more than the programmable time limit, it is then assumed that the batteries have been deeply discharged and require additional charging. This is accomplished by the constant voltage mode. In this mode the batteries will be held at the programmable float voltage, the normal charge level, for a programmable period of time. A typical time period is approximately 4 hours. After this period has expired the charger is allowed to return to maintenance mode. The constant voltage mode time period must be allowed to fully expire even though constant power mode will be reentered with any inverter operation which is not short duration line interactive operation (e.g., during tap switching). The constant voltage software clock is therefore not reset due to inverter operation, and this mode will continue from where it left off before inverter operation. If, however, after inverter operation, constant power mode persists for more than the time indicated by that mode, the constant voltage timer will be reset causing this mode to essentially restart.

The battery charger periodic mode is used to equalize the batteries. This mode has two programmable parameters. The first is the charging interval which dictates how frequently this mode will be used to equalize the batteries. A typical charging interval is 30 days. The second parameter is the duration of the periodic, or equalization charge. This duration parameter is typically 18 hours. This mode is always entered into when the UPS 10 is installed or whenever the microprocessor 100 memory is changed. The periodic modes reduces the probability of system failure due to battery sulfation as a result of units remaining in storage for long periods prior to installation. Preferably, an InstallEqualization parameter is initially defaulted to a value of 1. When the UPS is installed at the site, this parameter will cause the battery charger to deliver one complete periodic charge (equalization charge). Once this periodic charge is completed (it must be entirely completed), the InstallEqualization parameter is reset (to 0). Subsequently, when the UPS keyswitch is turned on by a suer, the charger will not deliver a periodic (equalization) charge; it will go into constant current mode on start-up unless some event causes the InstallEqualization parameter to be set to a value of 1 (e.g., the EPROMs are changed to a set that represents a different software version). Thus, if the user leaves his or her unit on for less time than it takes to complete the equalization charge, the unit will restart the equalization charge from the beginning the next time the unit's keyswitch is turned on.

It is also preferable that the periodic mode be entered into if a low battery shutdown occurs within the first 1½ minutes of operation of the system after system start up. In such a case, sulfated batteries may be assumed. The charge level for the periodic mode is the float or normal charge voltage.

It is preferable that the user be told which charger mode is currently active. The charging mode may be indicated by a decimal code which is displayed on the user display 41.

When the UPS 10 is used with a generator as the main AC power source, conditions which can lead to difficulty of stable line operation are (A) running a poor generator (and/or UPS) at its full power rating, (B) running other (substantial) loads besides the UPS on the generator, (C) long cable runs or other conditions which create a soft source impedance to the UPS, and (D) heavy and frequency load switching on the generator and/or the UPS, especially surge loads. Under these conditions, it is preferable that the UPS operate with parameters which can be set that will improve the odds of successful operation as described below.

A GENERATOR parameter preferably is used to prohibit line-interactive operation immediately after a tap change for a number of cycles determined by an INV_LOCKOUT parameter. When a soft source is loaded or unloaded, the source impedance is stimulated and produces a natural response that often causes the input voltage to exhibit large spikes and glitches. In normal line-interactive operation, this can cause intermittent inverter operation, which unloads the source and stimulates another natural response (more glitches). The "dirty" line can thus be propagated and it may become very difficult to reacquire stable line operation. However, the glitches and spikes of the natural response will decay as long as they are not restimulated by unloading the source (as happens in line-interactive operation when the static switch opens and the inverter is energized). An exception to this is when other loads, besides the UPS, are also applied to the generator.

With the GENERATOR parameter set, the microprocessor will ignore the glitches for the number of line cycles indicated by the INV_LOCKOUT parameter, and not allow line-interactive inverter operation during those cycles. Consequently, the source voltage is given a few cycles to "settle down" before line-interactive operation is allowed. During this time, the microprocessor is still monitoring the rms voltage of the output (i.e., monitors line via the transformer turns ratio) so that the UPS can change taps or transfer to inverter during a sag, ring-down or dropout. These parameters cannot compensate for loads paralleled to the UPS which may stimulate the source impedance and/or excessively load the generator.

When loads are also applied to the generator in parallel with the UPS (and with poor generators where the UPS is the only load), it may be necessary to set a LineDeltaMode parameter to "poor line" mode—e.g., set LineDeltaMode to a value of 2. This decreases the sensitivity of the line-fault detection circuits, thereby allowing larger glitches to occur before line-interactive inverter operation occurs. In "poor line" mode, LineDeltaMode is at its minimum sensitivity (maximum tolerance of line disturbances). The tradeoff of using this mode is that transfer quality will be diminished—however, line quality (generator output quality) is generally quite poor in the first place. LineDeltaMode can also be set to "normal mode" (value=1). In this mode, the user can choose from among the whole range of line-fault detection sensitivity. This is done by setting a LINEDELTA parameter to a hexadecimal number between FF8C and FFDD. A lower number corresponds to less sensitivity to glitches (i.e., the lower the number, the wider is the line delta).

In "adaptive mode" (the default mode, value=3), the LINEDELTA is automatically adjusted by the microprocessor to find a point that will optimize the tradeoff between inverter activity and transfer quality. This tradeoff can be shaped by the user via two parameters, GlitchSensitivity and LessDelta. GlitchSensitivity represents the limit of the number of glitches recorded per 250 millisecond interval. Each time the limit is exceeded, the LINEDELTA will be widened by 1/130 of its full value (i.e., become less sensitive to glitches). This action will tend to minimize the number of glitches "seen" by the line-fault detection circuits. GlitchSensitivity is reset every 250 milliseconds or any time long-term inverter mode operation is entered. LessDelta represents the number of consecutive 250 millisecond periods during which a glitch must not be detected before LINEDELTA will be decreased by 1/130 of its full value (which increases sensitivity to glitches). LessDelta is reset any time a glitch is detected, or whenever it allows LINEDELTA to be decreased. This mode should not be used with poor generators because its action is too slow, and frequency transfers to long term inverter operation will prevent LINEDELTA from being systematically reduced.

Changing the frequency slew rate can improve the odds of successful line-interactive mode operation by allowing the phase locked loop (PLL) to track more rapidly slewing input voltage (an exemplary default value of 377 provides a fast slew rate of approximately 30 Hz/sec) and increasing the PLL locked phase window.

It is understood that the invention is not confined to the embodiments described herein as illustrative, but embraces all such modified forms thereof as come within the scope of the following claims.

What is claimed is:

1. An uninterruptible power system of the type having AC input terminals which may be connected to an AC power system, AC output terminals to which a load may be connected, a transformer with a primary connected to receive AC input power provided to the AC input terminals, a secondary connected to the output terminals, and an auxiliary primary, an inverter connected to the auxiliary primary, a battery supplying DC power to the inverter, the inverter adapted to switch to provide alternating polarity of the battery voltage across the auxiliary primary to provide AC output power at the secondary and at the output terminals to supply the load when power from the AC power system is not available, the improvement comprising:

(a) a plurality of primary tap switches connected between the input terminals and the primary and placed at different effective voltage levels along the primary;

(b) tap closing means for closing a selected one of the plurality of primary tap switches in response to a primary tap control signal;

(c) a buck-boost winding on the transformer;

(d) buck-boost winding switching means connected to the primary and the buck-boost winding for selectively responding to a buck-boost control signal to connect the buck-boost winding to act as a boost to effectively increase the secondary to primary turns ratio by passing an opposing current through the buck-boost winding so as to create a flux in the transformer in opposition to a flux in the primary, to act as a buck to effectively reduce the secondary to primary turns ratio by passing an aiding current running in a direction through the buck-boost winding so as to create a flux in the transformer aiding the flux in the primary, or to be bypassed altogether such that there is no current in the buck-boost winding to provide a normal turns ratio between the secondary and primary; and (e) control means for providing the primary tap control signal to close a selected one of the primary tap switches and for providing the buck-boost winding control signal to connect the buck-boost winding so that the voltage level at the output terminals is maintained within a selected range of a preferred output voltage level despite changes in the voltage level at the input terminals.

2. The uninterruptible power system of claim 1 wherein the control means includes means for monitoring the voltage level at the output terminals and wherein the control means utilizes the monitored voltage level at the output terminals to change to a different combination of primary tap control and buck-boost winding control signals when the voltage level at the output terminals deviates from the preferred output voltage level by more than a selected voltage level and for more than a selected duration such that a different combination will be provided after a shorter duration for a larger voltage level deviation and after a longer duration for a smaller voltage level deviation.

3. The uninterruptible power system of claim 2 wherein the means for monitoring the voltage level at the output terminals determines the mean-square value of the output voltage at the output terminals which is compared by the control means with a mean-square preferred voltage level to determine the required combination of primary tap control signal and buck-boost winding control signal to maintain the output voltage at the preferred voltage level.

4. The uninterruptible power system of claim 2 wherein the relationship between the voltage level deviation and the duration of the deviation allowed by the control means before a different combination of primary tap and buck-boost winding control signals is provided by the control means is defined by the curve of the Computer Business Equipment Manufacturer's Association computer susceptibility time versus voltage guideline.

5. The uninterruptible power system of claim 1 wherein the control means, when providing the primary tap and buck-boost control signals while AC power is available at the input terminals determines which primary tap and buck-boost control signals to provide based upon the primary tap and buck-boost control signals which are currently provided, the output voltage level at the output terminals, and the preferred output voltage level.

6. The uninterruptible power system of claim 1 wherein the control means, when providing the primary tap and buck-boost control signals when the system transitions from providing power to the output terminals from the inverter to providing power to the output terminals from AC power available at the input terminals, determines which primary tap and buck-boost control signals to provide based upon the input voltage level from the AC power system at the input terminals, the output current supplied by the inverter to the output terminals, and the preferred output voltage level.

7. The uninterruptible power system of claim 1 including a static switch connected between the AC input terminals and the primary of the transformer, wherein the control means controls the static switch, the tap closing means, the buck-boost switching means and the inverter to provide switching of the tap switches and buck-boost winding switching means by opening the static switch and turning on the inverter during switching and turning off the inverter and closing the static switch after switching has been completed thereby to avoid substantial interruption of the output voltage waveform at the output terminals.

8. The uninterruptible power system of claim 7 wherein the control means controls the switching of the static switch, the primary tap closing means, and the buck-boost switching means to occur at zero voltage crosses of the AC input voltage waveform.

9. The uninterruptible power system of claim 1 including a static switch connected between the input terminals and the transformer primary and wherein the control means the static switch to disconnect the AC input power from the primary, switches on the inverter to provide AC power to the load through the auxiliary primary, and conducts diagnostic testing on the availability of primary tap switches and the buck-boost winding switching means before changing the primary tap and buck-boost control signals, such that an unavailable combination of primary taps and buck-boost switching means will not be chosen, and switches off the inverter and reconnects the AC input power to the primary after changing the primary tap and buck-boost control signals.

10. The uninterruptible power system of claim 1 wherein the primary tap switches and the buck-boost switching means include electrically driven relay switches.

11. The uninterruptible power system of claim 1 including a static switch connected between the input terminals and the transformer primary, the control means controlling the static switch to open during failure of power at the input terminals, and bypass mode switching means, including a controllable relay switch connected in parallel with the static switch, the control means switching the controllable relay switch and one primary tap switch such that power is provided to the secondary when one or more of the static switch, tap closing means, buck-boost switching means, or control means are disabled.

12. The uninterruptible power system of claim 11 wherein the bypass mode switching means uses one of two primary tap switches to connect the AC input power to the primary and where the tap switch used is selected as the last one of the two primary tap switch used to connect the AC power to the primary before the bypass mode switching means was activated.

13. The uninterruptible power system of claim 11 wherein the bypass mode switching means may be manually activated.

14. The uninterruptible power system of claim 11 further comprising means for monitoring one or more components of the uninterruptible power system and automatically activating the bypass mode switching means upon failure of one of the components.

15. The uninterruptible power system of claim 14 further comprising means for assuring that the bypass mode switching means is not activated prematurely by delaying operation of the bypass mode switching means when the uninterruptible power system is initially turned on.

16. The uninterruptible power system of claim 1 wherein the control means includes a microprocessor and a control program stored in memory.

17. A method for regulating AC output power in an uninterruptible power system of the type having AC input terminals which may be connected to an AC power system receive power therefrom, output terminals to which a load may be connected, a transformer with a primary connected to receive AC input power provided to the input terminals, a secondary connected to the output terminals, and an auxiliary primary, an inverter connected to the auxiliary primary, a battery supplying DC power to the inverter, the inverter adapted to switch to provide alternating polarity of the battery voltage across the auxiliary primary to provide AC output power at the secondary and the output terminals to supply the load when power from the AC power system is not available, comprising the steps of:

closing one of a plurality of primary tap switches connected between the input terminals and the primary and placed at different effective voltage levels along the primary, and providing one of an additional flux in the transformer in opposition to a flux in the primary, an additional flux in the transformer aiding the flux in the primary, or no additional flux so that the voltage level at the output terminals is maintained near a preferred output voltage level as the voltage level at the input terminals changes.

18. The method of claim 17 further comprising the steps of:

monitoring the voltage level at the output terminals; and providing a different combination of primary tap switch to be closed and additional or no additional flux to be provided when the voltage level at the output terminals deviates from the preferred output voltage level by more than a selected voltage level and for more than a selected duration such that a different combination is provided after a shorter duration for a larger voltage level deviation and after a longer duration for a smaller voltage level deviation.

19. The method of claim 17 further comprising the step of, while AC power is available at the input terminals, determining a combination of primary tap switch to be closed and additional flux or no additional flux to be provided based upon the primary tap which is currently closed, the additional flux or no additional flux which is currently provided, the output voltage level at the output terminals, and the preferred output voltage level.

20. The method of claim 17 further comprising the step of, when the system transitions from providing power to the output terminals from the inverter to providing power to the output terminals from AC power available at the input terminals, determining a combination of primary tap switch to be closed and additional flux or no additional flux to be created based upon an input voltage level at the input terminals, an output current at the output terminals, and the preferred output voltage level.

21. The method of claim 17 further comprising the steps of:
   before providing a different combination of primary tap switch to be closed and additional flux or no additional flux to be created,
   disconnecting the AC input terminals from the primary;
   switching on the inverter to provide AC power to the load through the auxiliary primary;
   conducting diagnostic testing on the availability of the primary taps and additional the availability of flux in and or opposition to the flux from the primary such that an unavailable combination of primary tap switches and additional flux or no additional flux will not be chosen; and
   switching off the inverter and reconnecting the AC input to the primary after closing the one primary tap and creating the additional aiding or opposing flux or no additional flux.

22. A method for detecting AC power system undervoltage faults in uninterruptible power systems of the type comprising AC input terminals which may be connected to an AC power system, a battery supplying DC power to an inverter, and output terminals which are provided with AC power from the input terminals when the AC power system power is available and which are provided with power from the inverter when the AC power system fails, comprising the steps of:
   (a) monitoring the AC power system input voltage waveform provided at the input terminals;
   (b) adding a tolerance voltage level to the system input voltage waveform to form an adjusted input voltage waveform;
   (c) comparing the adjusted input voltage waveform with a reference voltage waveform;
   (d) indicating a power system failure if the adjusted input voltage waveform is less than the reference voltage waveform;
   (e) increasing the tolerance voltage level when the number of power system failure indications over a selected duration exceeds a selected number; and
   (f) reducing the tolerance voltage level when there are no power system failure indications over a second selected duration.

23. A method for detecting AC power system overvoltage faults in uninterruptible power systems of the type comprising AC input terminals which may be connected to an AC power system, a battery supplying DC power to an inverter, and output terminals which are provided with AC power from the input terminals when the AC power system power is available and which are provided with power from the inverter when the AC power system fails, comprising the steps of:
   (a) monitoring an AC power system input voltage waveform provided at the input terminals;
   (b) adding a tolerance voltage level to a reference voltage waveform to form an adjusted reference voltage waveform;
   (c) comparing the adjusted reference voltage waveform with the input voltage waveform;
   (d) indicating a power system failure if the input voltage waveform is greater than the adjusted reference voltage waveform;
   (e) increasing the tolerance voltage level when the number of power system failure indications over a selected duration exceeds a selected number; and
   (f) reducing the tolerance voltage level when there are no power system failure indications over a second selected duration.

24. A method for detecting AC power system faults in uninterruptible power systems of the type comprising AC input terminals which may be connected to an AC power system, a battery supplying DC power to an inverter, and output terminals which are provided with AC power from the input terminals when the AC power system power is available and which are provided with power from the inverter when the AC power system fails, comprising the steps of:
   (a) monitoring an AC power system input voltage waveform provided at the input terminals;
   (b) adding a tolerance voltage level to a reference voltage waveform to form an adjusted reference voltage waveform;
   (c) comparing the adjusted reference voltage waveform with the input voltage waveform;
   (d) adding a tolerance voltage level to the input voltage waveform to form an adjusted input voltage waveform;
   (e) comparing the adjusted input voltage waveform with the reference voltage waveform;
   (f) indicating a power system failure if either the input voltage waveform is greater than the adjusted reference voltage waveform or the adjusted input voltage waveform is less than the reference voltage waveform;
   (g) increasing the tolerance voltage levels when the number of power system failure indications over a selected duration exceeds a selected number; and
   (h) reducing the tolerance voltage levels when there are no power system failure indications over a second selected duration.

25. An uninterruptible power system comprising:
   (a) an inverter, AC input terminals which may be connected to an AC power system, a battery supplying DC power to the inverter, output terminals, and switching means for providing AC power to the output terminals from the input terminals when the AC power system power is available and switching to provide power from the inverter to the output terminals when the AC power system fails;
   (b) means for monitoring an AC power system input voltage waveform provided at the input terminals, and providing a measured value thereof;
   (c) means for adding a tolerance voltage level to the measured value of the system input voltage waveform to form an adjusted input voltage waveform;
   (d) means for comparing the adjusted input voltage waveform with a reference voltage waveform;
   (e) means for indicating a power system failure if the adjusted input voltage waveform is less than the reference voltage waveform;
   (f) means for increasing the tolerance voltage level when the number of power system failure indications over a selected duration exceeds a selected number; and
   (g) means for reducing the tolerance voltage level when there are no power system failure indications over a second selected duration.

26. The uninterruptible power system of claim 25 wherein the means for comparing the adjusted input voltage waveform with the reference waveform includes a comparator circuit.

27. An uninterruptible power system comprising:
(a) an inverter, AC input terminals which may be connected to an AC power system, a battery supplying DC power to the inverter, output terminals, and switching means for providing AC power to the output terminals from the input terminals when the AC power system power is available and switching to provide power from the inverter to the output terminals when the AC power system fails;
(b) means for monitoring an AC power system input voltage waveform provided at the input terminals, and providing a measured value thereof;
(c) means for adding a tolerance voltage level to a reference voltage waveform to form an adjusted reference voltage waveform;
(d) means for comparing the adjusted reference voltage waveform with the measured input voltage waveform;
(e) means for indicating a power system failure if the adjusted reference voltage waveform is less than the measured input voltage waveform;
(f) means for increasing the tolerance voltage level when the number of power system failure indications over a selected duration exceeds a selected number; and
(g) means for reducing the tolerance voltage level when there are no power system failure indications over a second selected duration.

28. The apparatus for detecting AC power system faults of claim 27 wherein the means for comparing the measured input voltage waveform with the adjusted reference voltage waveform includes a comparator circuit.

29. An uninterruptible power system comprising:
(a) an inverter, AC input terminals which may be connected to an AC power system, a battery supplying DC power to the inverter, output terminals, and switching means for providing AC power to the output terminals from the input terminals when the AC power system power is available and switching to provide power from the inverter to the output terminals when the AC power system fails;
(b) means for monitoring an AC power system input voltage waveform provided at the input terminals, and providing a measured value thereof;
(c) means for adding a tolerance voltage level to the measured input voltage waveform to form an adjusted input voltage waveform;
(d) means for adding the tolerance voltage level to a reference voltage waveform to form an adjusted reference voltage waveform;
(e) means for comparing the adjusted reference voltage waveform with the measured input voltage waveform;
(f) means for comparing the adjusted input voltage waveform with the reference voltage waveform;
(g) means for indicating a power system failure if either the adjusted reference voltage waveform is less than the measured input voltage waveform or the adjusted input voltage waveform is less than the reference voltage waveform;
(h) means for increasing the tolerance voltage levels when the number of power system failure indications over a selected duration exceeds a selected number; and
(i) means for reducing the tolerance voltage level when there are no power system failure indications over a second selected duration.

30. The uninterruptible power system of claim 29 wherein the means for comparing the measured input voltage waveform with the adjusted reference voltage waveform and the means for comparing the adjusted input voltage waveform with the reference voltage waveform include a comparator circuit.

31. The uninterruptible power system of claim 29 wherein the reference voltage waveform is constructed of a moving average of current and previous input voltage waveforms.

32. A method for determining the zero voltage cross of an AC power system input signal at input terminals of an uninterruptible power system, comprising the steps of:
(a) monitoring the AC input power voltage at the input terminals to provide an AC input signal and delaying the AC input signal by a selected time delay to form a delayed input signal;
(b) squaring the input signal to form a squared input signal, and squaring the delayed input signal to form a squared delayed input signal;
(c) inverting the squared delayed input signal to form an inverted squared delayed input signal;
(d) summing the squared input signal and the inverted squared delayed input signal and simultaneously integrating the resulting summation to form an integration result; and
(e) indicating a zero voltage cross indication when the integration result exceeds a selected value.

33. The method of claim 32 comprising the additional step of determining the frequency of the input signal by measuring the duration between zero voltage cross indications.

34. An apparatus for determining the zero voltage cross of an AC power system input signal at input terminals of an uninterruptible power system comprising:
(a) means for monitoring the AC input power voltage at the input terminals to provide an AC input signal;
(b) means for delaying the AC input signal by a time delay to form a delayed input signal;
(c) means for squaring the input signal to form a squared input signal, and means for squaring the delayed input signal to form a squared delayed input signal;
(d) means for inverting the squared delayed input signal to form an inverted squared delayed input signal;
(e) means for summing the squared input signal and the inverted squared delayed input signal and simultaneously integrating the resulting summation to form an integration result; and
(f) means for indicating a zero voltage cross indication when the integration result exceeds a certain value.

35. The apparatus of claim 34 additionally comprising means for determining the frequency of the input signal by measuring the duration between zero voltage cross indications.

36. The apparatus of claim 34 wherein the means for delaying the input signal, the means for squaring the input signal, the means for squaring the delayed input signal, the means for inverting the squared delayed input signal, the means for summing the squared input signal and the inverted squared delayed input signal and integrating the summation, and the means for indicating a zero voltage cross indication include analog circuits.

37. A method for charging a battery in an uninterruptible power system of the type having AC input terminals which may be connected to an AC power system, a transformer with a primary connected to receive AC input power provided at the input terminals, a secondary connected to output terminals connectable to a load, and an auxiliary primary, an inverter connected to the auxiliary primary, a battery supplying DC power to the inverter, the inverter adapted to switch to provide alternating polarity of the battery voltage across the auxiliary primary to provide AC output power at the secondary to supply the load when power from the AC power system is not available, and a battery charger connected to the auxiliary primary which acts as a secondary when power from the AC power system is available, comprising the steps of:

(a) monitoring the voltage of the battery and providing a battery monitoring signal indicating the voltage level on the battery;

(b) storing battery charging characteristics in memory;

(c) selecting a battery charger mode depending on the battery monitoring signal and the stored battery charging characteristics; and (d) controlling the battery charger to implement the charger mode selection.

38. A method for charging a battery in an uninterruptible power system of the type having AC input terminals which may be connected to an AC power system, a transformer with a primary connected to receive AC input power provided at the input terminals, a secondary connected to output terminals connectable to a load, and an auxiliary primary, an inverter connected to the auxiliary primary, a battery supplying DC power to the inverter, the inverter adapted to switch to provide alternating polarity of the battery voltage across the auxiliary primary to provide AC output power at the secondary to supply the load when power from the AC power system is not available, and a battery charger connected to the auxiliary primary which acts as a secondary when power from the AC power system is available, comprising the steps of:

(a) monitoring the voltage of the battery and providing a battery monitoring signal indicating the voltage level on the battery;

(b) entering a constant power mode when input power from the AC power system becomes available after the inverter has been providing AC output power, and wherein the battery is charged by the charger at a normal charge voltage level until the battery monitoring signal indicates that the battery has been charged to the normal charge voltage level;

(c) entering a maintenance mode when the battery has been charged to the normal charge voltage level by the constant power mode in less than or equal time to a selected charging time duration, and wherein the battery is then charged by the charger at a maintenance voltage level which is less than the normal charge voltage level;

(d) entering a constant voltage mode when the battery has been charged to the normal charge voltage in the constant power mode in more time than a selected charging time duration, and wherein the battery is then charged by the charger at a normal charge voltage level for a selected constant voltage duration, and thereafter entering the maintenance mode when the constant voltage duration has expired;

(e) entering a periodic mode at a periodic interval wherein the battery is charged by the charger at a normal charge voltage level for a periodic charge duration, and entering the maintenance mode when the periodic charge duration has expired; and (f) controlling the battery charger to implement the charger mode selection.

39. The method of claim 38 comprising the additional steps of:

(a) providing a battery temperature signal indicating the temperature of the battery; and (b) increasing the normal charge voltage level when the battery temperature signal indicates that the battery temperature has fallen below a selected temperature.

40. An uninterruptible power system of the type having AC input terminals which may be connected to an AC power system, a transformer with a primary connected to receive AC input power provided at the input terminals, a secondary connected to output terminals connectable to a load, and an auxiliary primary, an inverter connected to the auxiliary primary, a battery supplying DC power to the inverter, the inverter adapted to switch to provide alternating polarity of the battery voltage across the auxiliary primary to provide AC output power at the secondary to supply the load when power from the AC power system is not available, and a battery charger connected to the auxiliary primary which acts as a secondary when power from the AC power system is available, the improvement comprising:

(a) means for monitoring the voltage of the battery and providing a battery monitoring signal indicating the voltage level on the battery;

(b) means for storing battery charging characteristics in memory;

(c) means for selecting a battery charger mode depending on the battery monitoring signal and the stored battery charging characteristics; and (d) means for controlling the battery charger to implement the charger mode selection made by the means for selecting.

41. An uninterruptible power system of the type having AC input terminals which may be connected to an AC power system, a transformer with a primary connected to receive AC input power provided at the input terminals, a secondary connected to output terminals connectable to a load, and an auxiliary primary, an inverter connected to the auxiliary primary, a battery supplying DC power to the inverter, the inverter adapted to switch to provide alternating polarity of the battery voltage across the auxiliary primary to provide AC output power at the secondary to supply the load when power from the AC power system is not available, and a battery charger connected to the auxiliary primary which acts as a secondary when power from the AC power system is available, the improvement comprising:

(a) means for monitoring the voltage of the battery and providing a battery monitoring signal indicating the voltage level on the battery;

(b) means for controlling the battery charger to enter a constant power mode when input power from the AC power system becomes available after the inverter has been providing AC output power, and wherein the battery is charged by the charger at a normal charge voltage level until the battery monitoring signal indicates that the battery has been charged to the normal charge voltage level;

(c) means for controlling the battery charger to enter a maintenance mode when the battery has been charged to the normal charge voltage level in the constant power mode in less than or equal time to a selected charging time duration, and wherein the battery is then charged by the charger at a maintenance voltage level which is less than the normal charge voltage level;

(d) means for controlling the battery charger to enter a constant voltage mode when the battery has been charged to the normal charge voltage in the constant power mode in more time than the selected charging time duration, and wherein the battery is then charged by the charger at a normal charge voltage level for a selected constant voltage duration, and thereafter for controlling the charger to enter the maintenance mode when the constant voltage duration has expired; and (e) means for controlling the battery charger to enter a periodic mode at a periodic interval, and wherein the battery is charged at a normal charge voltage level by the charger for a selected periodic charge duration, and to enter the maintenance mode when the periodic charge duration has expired.

42. The uninterruptible power system of claim 41 comprising additionally:

(a) means for providing a battery temperature signal indicating the temperature of the battery; and (b) means for controlling the battery charger to increase the normal charge voltage level when the battery temperature signal indicates that the battery temperature has fallen below a selected temperature.

43. The uninterruptible power system of claim 41 wherein the means for controlling the battery charger includes a signal with a duty cycle which switches the battery charger output voltage ON and OFF and wherein the battery charger is controlled by varying the duty cycle.

44. A battery charger for an uninterruptible power system of the type having AC input terminals which may be connected to an AC power system and AC output terminals to which a load may be connected, with a power path between the AC input and output terminals, and a battery connected to an inverter to supply AC output power to the output terminals when the AC power system connected to the input terminals has failed, comprising:

(a) a boost converter connected to receive power from the AC power system connected to the input terminals and to provide DC power to the battery to charge the battery, the boost converter having a rectifier connected to the power path to receive AC input power and providing a rectified DC output voltage and an inductor and a controllable switch connected in series to provide a current path from the DC output of the rectifier through the inductor and the controllable switch back to the rectifier when the switch is closed, a node connecting the controllable switch and the inductor connected through a diode to the battery so that current from the inductor flows to the battery when the controllable switch is opened;

(b) a timer having an output connected to the controllable switch to provide an on and off signal to open and close the controllable switch at a high frequency, the times responsive to control signals to control at least the on-time of the timer output control signal during which the controllable switch is closed; and (c) current control means for monitoring the current flowing through the controllable switch when it is closed and for comparing the value of the current to the output voltage of the rectifier and connected to control the timer to turn off the output signal of the timer to the controllable switch to open the controllable switch when the current through the controllable switch reaches a level proportional to the DC output voltage of the rectifier, whereby the maximum input current to the charger tracks the AC input voltage so as to present a substantially unity power factor to the AC power system which is providing power to the charger.

45. The battery charger for an uninterruptible power system of claim 44 wherein the means for monitoring the current through the controllable switch includes a transformer having a primary connected in series with the controllable switch and a secondary, the secondary of the transformer connected to provide its voltage across a voltage divider, a comparator having one input which receives the voltage from the voltage divider, and another voltage divider connected to the output of the rectifier and providing its voltage to the other input of the comparator, such that the comparator compares the instantaneous voltage provided across the voltage divider connected to the transformer to the voltage across the voltage divider connected to the output of the rectifier, and wherein the comparator changes state when the voltage across the voltage divider connected to the transformer reaches the voltage across the voltage divider connected to the output of the rectifier, the output of the comparator connected to the timer to turn off the timer output when the comparator changes state so that the control signal to the controllable switch is turned off to open the controllable switch.

46. The battery charger for an uninterruptible power system of claim 44 wherein the controllable switch comprises a power MOSFET.

47. The battery charger for an uninterruptible power system of claim 44 further including an overvoltage protection circuit comprising a voltage divider connected between the battery and a ground return to the battery, the output of the voltage divider connected to a controllable voltage comparison device which switches when the voltage across the voltage divider exceeds the trigger level of the controllable switching device, the output of the controllable switching device connected to the timer to turn off the output of the timer and open the controllable switch when the controllable switching device switches states.

48. The battery charger for an uninterruptible power system of claim 44 further including control means connected to the timer and connected to the battery to monitor the battery voltage, the control means controlling the on-time of the timer and the time that the controllable switch is closed to control the voltage applied by the battery charger to the battery.

49. The battery charger for an uninterruptible power system of claim 48 wherein the control means includes a microprocessor connected to the battery to monitor the battery voltage, the microprocessor providing a high frequency switched pulse output to the timer to control the on and off time of the timer, the microprocessor varying the duty cycle of the on time of its output signal to the timer to control the on time of the controllable switch during which it is closed and to thereby control the output voltage of the charger across the battery.

50. The battery charger for an uninterruptible power system of claim 44 further including a transformer with a primary connected to the power path to receive AC input power provided to the AC input terminals of the uninterruptible power system, a secondary connected to the output terminals, and an auxiliary primary, the inverter and the battery charger connected to the auxiliary primary, and including a plurality of primary tap switches connected between the input terminals and the primary and placed at different effective voltage levels along the primary; tap closing means for closing a selected one of the plurality of primary tap switches in response to a primary tap control signal; a buck-boost winding on the transformer; buck-boost winding switching means connected to the primary and the buck-boost winding for selectively responding to a buck-boost control signal to connect the buck-boost winding to act as a boost to effectively increase the secondary to primary turns ratio by passing an opposing current through the buck-boost winding so as to create a flux in the transformer in opposition to a flux in the primary, to act as a buck to effectively reduce the secondary to primary turns ratio by passing an aiding current running in a direction through the buck-boost winding so as to create a flux in the transformer aiding the flux in the primary, or to be bypassed altogether such that there is no current in the buck-boost winding to provide a normal turns ratio between the secondary and primary; and control means for providing the primary tap control signal to control a selected one of the primary tap switches and for providing the buck-boost winding control signal to connect the buck-boost winding so that the voltage level at the output terminals and at the output of the auxiliary primary is maintained within a selected range of preferred output voltage level despite changes in the voltage level at the input terminals, the auxiliary primary connected to the rectifier of the charger whereby the output voltage of the rectifier is substantially regulated and the output power of the battery charger provided to the battery is substantially regulated.

51. The battery charger for an uninterruptible power system of claim 50 wherein the control means includes means for monitoring the voltage level at the output terminals and wherein the control means utilizes the monitored voltage level at the output terminals to change to a different combination of primary tap control and buck-boost winding control signals when the voltage level at the output terminals deviates from the preferred output voltage level by more than a selected voltage level and for more than a selected duration such that a different combination will be provided after a shorter duration for a larger voltage level deviation and after a longer duration for a small voltage level deviation.

* * * * *